(12) United States Patent
Shirai et al.

(10) Patent No.: US 8,511,896 B2
(45) Date of Patent: Aug. 20, 2013

(54) ROLLING DEVICE

(75) Inventors: Takeki Shirai, Tokyo (JP); Soshi Miyahara, Tokyo (JP); Hideki Fujii, Tokyo (JP); Kentaro Hikomoto, Tokyo (JP)

(73) Assignee: THK Co., Ltd., Tokyo (JP)

( * ) Notice: Subject to any disclaimer, the term of this patent is extended or adjusted under 35 U.S.C. 154(b) by 656 days.

(21) Appl. No.: 12/678,752

(22) PCT Filed: Aug. 20, 2008

(86) PCT No.: PCT/JP2008/064780
§ 371 (c)(1),
(2), (4) Date: Mar. 18, 2010

(87) PCT Pub. No.: WO2009/041190
PCT Pub. Date: Apr. 2, 2009

(65) Prior Publication Data
US 2010/0192711 A1  Aug. 5, 2010

(30) Foreign Application Priority Data

Sep. 28, 2007 (JP) .................................. 2007-254115
Feb. 27, 2008 (JP) .................................. 2008-045808

(51) Int. Cl.
*F16C 31/04* (2006.01)
*F16C 29/06* (2006.01)
*F16H 29/02* (2006.01)
*F16H 25/22* (2006.01)

(52) U.S. Cl.
USPC ........ 384/15; 384/7; 384/43; 384/45; 384/49; 74/89.4; 74/424.82

(58) Field of Classification Search
USPC .............. 384/13, 15, 45, 7, 43–44; 74/89.13, 74/89.23, 89.4, 89.44, 424.82, 424.86, 424.87
See application file for complete search history.

(56) References Cited

U.S. PATENT DOCUMENTS 3,170,336 A * 2/1965 Bohnhoff .................... 74/424.86
4,148,226 A * 4/1979 Benton ....................... 74/424.87
4,211,125 A * 7/1980 Benton ....................... 74/424.82

(Continued)

FOREIGN PATENT DOCUMENTS

JP  62-185961       11/1987
JP  05044810 A  *  2/1993

(Continued)

OTHER PUBLICATIONS

International Search Report—PCT/JP2008/064780—Nov. 25, 2008.

*Primary Examiner* — Marcus Charles
(74) *Attorney, Agent, or Firm* — Young & Thompson

(57) ABSTRACT

A rolling device having high silencing effect and requiring no positional alignment working to the seal is provided. The rolling device includes an inner member, an outer member and a number of rolling members disposed between these inner and outer members to thereby allow the outer member to carry out relative rotational motion with respect to the inner member. In such rolling device, an end plate 24 is mounted to each end portion of the outer member. This end plate 24 is provided with an end plate body 24a, a packing member 24c disposed on an abutting surface to the outer member and a seal member 24b slidably contacting the inner member with substantially no clearance. The end plate body 24a, the packing member 24c and the seal member 24b are integrally formed.

15 Claims, 26 Drawing Sheets

(56) References Cited

U.S. PATENT DOCUMENTS

| | | | |
|---|---|---|---|
| 4,841,796 A | 6/1989 | Teramachi | |
| 6,450,295 B1 * | 9/2002 | Tsukada et al. | 384/13 |
| 6,931,955 B2 * | 8/2005 | Yatsushiro et al. | 74/89.4 |
| 6,976,399 B2 * | 12/2005 | Michioka et al. | 74/89.4 |
| 2001/0010176 A1 * | 8/2001 | Tsukada et al. | 74/89.4 |
| 2002/0036384 A1 * | 3/2002 | Nakagawa | 277/628 |
| 2002/0113376 A1 * | 8/2002 | Yabe et al. | 277/570 |
| 2002/0152822 A1 * | 10/2002 | Chuo | 74/89.13 |
| 2006/0088430 A1 * | 4/2006 | Sakurai et al. | 417/572 |

FOREIGN PATENT DOCUMENTS

| | | | |
|---|---|---|---|
| JP | 11166608 A | * | 6/1999 |
| JP | 11-335657 | | 12/1999 |
| JP | 2002-364726 | | 12/2002 |
| JP | 2003172426 A | * | 6/2003 |
| JP | 2004-084823 | | 3/2004 |
| JP | 2005-308081 | | 11/2005 |
| JP | 2007205462 A | * | 8/2007 |
| JP | 2007211858 A | * | 8/2007 |

* cited by examiner

ROLLING DEVICE

CROSS REFERENCE TO RELATED APPLICATIONS

This Patent Application is a 371 National Stage entry of PCT Application No. PCT/JP2008/064780 filed on Aug. 20, 2008, entitled, "ROLLING DEVICE," the contents and teachings of which are hereby incorporated by reference in their entirety.

TECHNICAL FIELD

The present invention relates to a rolling device provided with a seal.

BACKGROUND ART

Conventionally, ball screws, linear guides, linearly driven type bearings, ball splines and the like are known as rolling devices. Each of these rolling devices such as ball screw is provided with: an inner member having an outer surface in which a rolling member rolling surface is formed; an outer member disposed outside the inner member and having a loaded rolling surface opposing to the rolling member rolling surface; and a number of rolling members disposed to be capable of rolling in a loaded rolling passage formed by the rolling member rolling surface and the load rolling surface, in which rotational motion and linear motion of the outer member relative to the inner member are permissible.

With such rolling device, a number of rolling members disposed between the inner member and the outer member roll repeatedly, so that contacting stress is repeatedly applied to constructional members of the rolling device. Because of this reason, metal materials or resin materials excellent in anti-fatigue life and friction-proof property are used for materials constituting the inner and outer members of the rolling device.

However, the conventional technology provides a case such that when a number of rolling members circulate along the rolling passage, noises are caused by mutual contact of the rolling members or contact of the rolling member rolling in the outer member against a wall surface of the rolling passage. In a conventional technology, in order to reduce such noises, a retainer is interposed between the rolling members to prevent the rolling members from contacting, or a sound isolation member is disposed so as to cover a member constituting a scoop portion and a rolling direction changing portion, at which the noises are liable to be generated. Furthermore, a seal member is disposed to an end portion of the outer member so as to remove foreign material on the rolling passage or prevent lubricating agent applied on the rolling member from leaking outside of the outer member.

As prior art publications disclosing noise reducing technology for the rolling devices mentioned above, the following Patent Publication 1 will be provided.

Patent Publication 1: Japanese Patent Application Laid-open Publication No. 2005-308081

DISCLOSURE OF THE INVENTION

Problems to be Solved by the Invention

However, sufficient noise reduction effect could not be obtained by the rolling devices according to the conventional technology, and it has been required to provide a further improved technology for silencing function. For example, in the conventional noise reducing technology mentioned above, a countermeasure to a noise generating source was applied, and accordingly, it was difficult to completely shut off the noise generating source because of constructional matter or cost.

Then, the inventors of the subject application focussed attention on the fact that noises generated in the rolling device leaks through a contacting portion of members constituting the outer member or a clearance or gap existing between the inner member and the outer member, and then hinted out an idea for improving the noise silencing or reducing performance by surely shutting off the portion from which the noises leak.

Furthermore, in the conventional technology, when a seal having a foreign material removing function and a lubricating agent holding function is mounted to an end plate, it is necessary to make position alignment working for ensuring an abutment of the seal against the rolling passage. In view of this matter, the inventors have conceived the possibility for providing a rolling device in which a seal positioning working can be eliminated.

The present invention is realization of the above idea of the inventors, and an object of the present invention is to provide a new rolling device capable of enhancing silencing effect by arranging a member for preventing noise generated in the rolling device from leaking outside.

Another object of the present invention is to provide a new rolling device capable of enhancing silencing effect with cheep cost.

Furthermore, the present invention aims to improve productivity of the rolling device by eliminating position alignment working of a seal in the rolling device.

Means for Solving the Problems

A rolling device according to the present invention comprises: an inner member having an outer surface in which a rolling member rolling surface is formed; an outer member disposed outside the inner member and having a loaded rolling surface opposing to the rolling member rolling surface of the inner member; and a number of rolling members disposed to be rollable in a loaded rolling passage formed in combination of the rolling member rolling surface and the loaded rolling surface so that the outer member performs relative rotational motion or linear motion with respect to the inner member, wherein end plates are mounted to end portions of the outer member, each of the end plates being provided with an end plate body and a seal member disposed so as to slidably contact the inner member with no clearance, and the end plate body and the seal member are integrally formed.

In the rolling device of the present invention, the end plate body and the seal member may be formed integrally through two-color formation process and an integrating unit for realizing integration of the seal member with respect to the end plate body may be provided.

In the rolling device of the present invention, the integrating unit may be composed of a plurality of through holes formed to the seal member and a plurality of connection members formed to the end plate body so as to penetrate the through holes, respectively.

In the rolling device of the present invention, the integrating unit may be composed of a plurality of through holes formed to the end plate body and a plurality of connection members formed to the seal member so as to penetrate the through holes, respectively.

In the rolling device of the present invention, it may be preferred that the connection members penetrate the corresponding through holes with plays, respectively.

In the rolling device of the present invention, the end plate body may be formed with a recessed portion to a position at which the seal member is formed so that the seal member is fitted to the recessed portion.

In the rolling device of the present invention, it may be preferred that the seal member is formed of a material softer than a material forming the end plate body.

In the rolling device of the present invention, the end plate may be provided with a packing member disposed to an abutting surface to the outer member, and the end plate body, the packing member and the seal member are formed integrally.

In the rolling device of the present invention, the end plate body, the packing member and the seal member may be formed integrally through two-color formation process, and an integrating unit may be provided for realizing integration of the packing member and the seal member with respect to the end plate body.

In the rolling device of the present invention, the integrating unit may be composed of a plurality of through holes formed to the end plate body and a plurality of connection members penetrating the through holes respectively and connecting the seal member and the packing member.

In the rolling device of the present invention, it may be preferred that the packing member and the seal member are formed as one member, and the integrating unit is composed of a plurality of through holes formed to the member including the packing member and the seal member and a plurality of connection members formed to the end plate body so as to penetrate the corresponding through holes, respectively.

In the rolling device of the present invention, it may be preferred that the connection members penetrate the corresponding through holes with plays, respectively.

In the rolling device of the present invention, the end plate body may be formed with recessed portions to positions at which the packing member and the seal member are formed so that the packing member and the seal member are fitted to the recessed portions.

In the rolling device of the present invention, it may be preferred that the abutting surface of the packing member to the outer member is formed so as to protrude over a mount surface to the outer member in the end plate body.

In the rolling device of the present invention, the packing member and the seal member may be formed of a material softer than a material forming the end plate body.

In the rolling device of the present invention, it may be preferred that the end plate is fastened to the outer member by means of bolt, and the packing member is disposed to a region avoiding, in location, a fastening position of the bolt.

In the rolling device of the present invention, it may be preferred that the end plate has a function as a pair of end caps disposed both end portions of the outer member, and the end caps are formed with rolling direction changing passages to be connected to the loaded rolling passage so as to circulate the rolling members.

Effects of the Invention

According to the present invention, noise generated within the rolling device can be substantially prevented from leaking outward, so that in comparison with a conventional rolling device, a rolling device improved in silencing effect can be provided. Furthermore, according to the present invention, the rolling device improved in the silencing effect can be provided with cheap manufacturing cost.

Furthermore, since the end plate according to the present invention is formed by integrally constructing a plurality of different members, in comparison with a conventional technology in which these members are formed of independently different members, the end plate having small dimension or size can be manufactured, resulting in that the location spaces of the seal member and the packing member can be easily ensured, thus increasing freedom in design and realizing compact and light structure of the rolling device.

Still furthermore, in the conventional technology, it is necessary to perform position alignment working at the time of mounting the seal member to the rolling device. However, in the rolling device of the present invention, since the outer member (such as nut member) to which the end plate is provided is formed with high dimensional precision through a wire discharge working, it is allowed for the end plate to be disposed so as to accord with the positioning standard of the outer member which is worked with high precision. Therefore, according to the present invention, the end plate can be disposed without performing the position alignment working with respect to the outer member.

Still furthermore, according to the present invention, a play exists between the through hole and the connection member forming the integrating unit, and by providing such play between each through hole and each connection member, the positional movement of the seal member with respect to the end plate body becomes possible. According to such positional movement, it becomes possible for the seal member to achieve the self-aligning performance with respect to the inner member such as screw shaft, whereby the preferred contacting condition between the seal member and the inner member can be always automatically realized, and the rolling device having high sealing performance can be provided.

REFFERENCE NUMERALS

10 - - - rolling device (as ball screw device of end cap system), 11 - - - screw shaft, 12 - - - rolling member rolling surface, 21 - - - nut member, 22 - - - loaded rolling surface, 23 - - - nut body, 24 - - - end cap, 24a - - - end cap body, 24b - - - seal member, 24c - - - packing member, 24d - - - connection member, 25 - - - screw shaft through hole, 26 - - - loaded rolling passage, 27 - - - non-loaded rolling passage, 28 - - - direction changing passage, 29 - - - bolt hole, 30 - - - through hole, 31 - - - ball, 32 - - - recessed portion (recess), 40 - - - rolling device (as ball screw device), 41 - - - nut member, 44 - - - end plate, 44a - - - end plate body, 44b - - - seal member, 44c - - - packing member, 44d - - - connection member, 49 - - - bolt hole, 50 - - - through hole, 52 - - - recessed portion (recess), 60 - - - linear guide device, 61 - - - track rail, 62 - - - loaded rolling groove, 71 - - - movable block, 72 - - - block body, 73 - - - end plate, 73a - - - end plate body, 73b - - - seal member, 73c - - - packing member, 73d - - - connection member, 74 - - - ball guide groove, 79 - - - bolt hole, 80 - - - through hole, 82 recessed portion (recess), 90 - - - end cap, 90a - - - end cap body, 90b - - - seal member, 90c - - - packing member, 90d - - - connection member.

MODE FOR CARRYING OUT THE INVENTION

Hereunder, preferred embodiments for carrying out the present invention will be explained with reference to the drawings. Further, it is to be noted that the following respective embodiments do not limit the present invention of the respective claims, and all the combination of the subject features described in the respective embodiments is not essential for the solution of the present invention.

Figure 1:
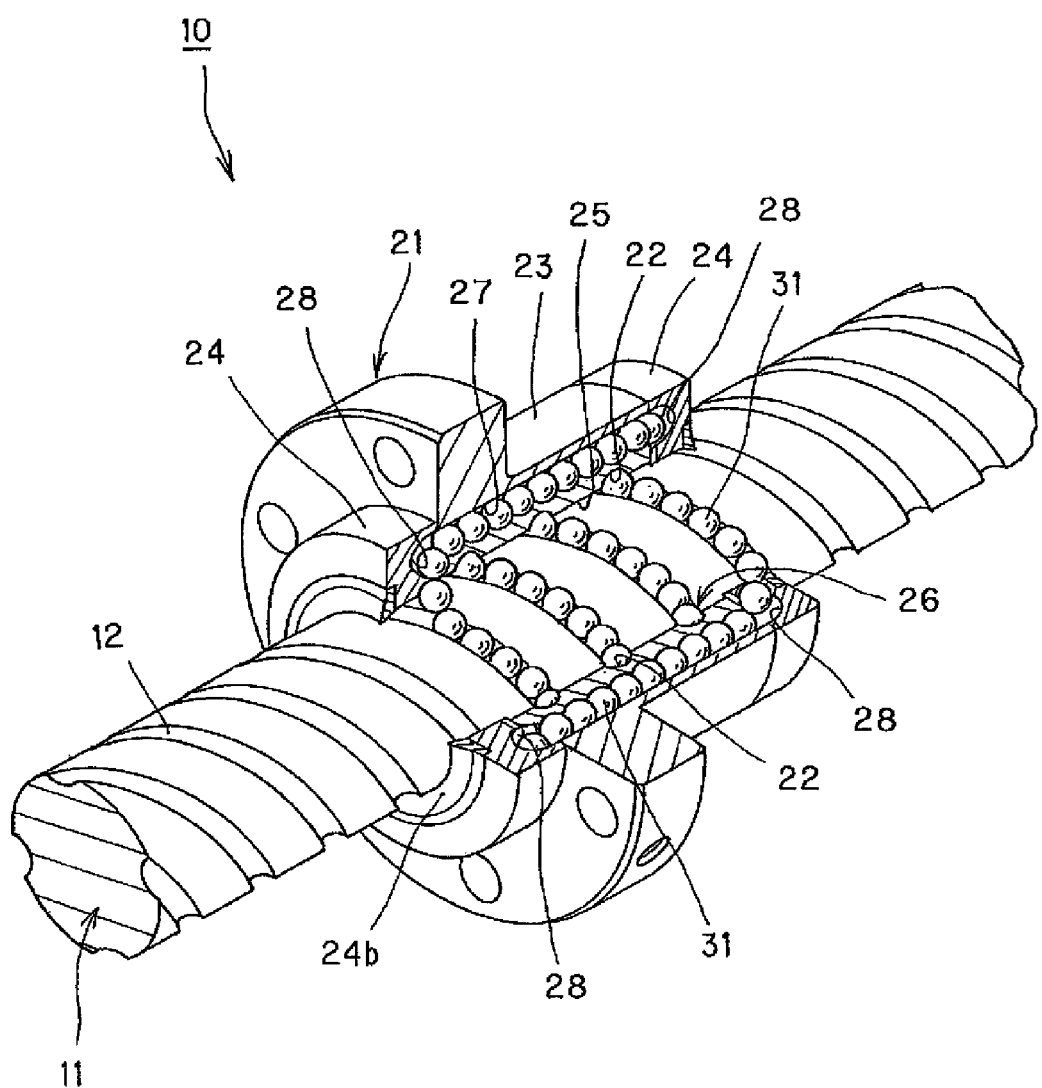
FIG. 1 is a perspective view of a rolling device according to a first embodiment of the present invention, partially broken for explanation of construction thereof.

FIG. 1 is a perspective view of a rolling device according to a first embodiment of the present invention, partially broken, for explanation of construction thereof. A rolling device 10 according to the first embodiment is constituted as a ball screw device, which is provided with a screw shaft 11 as inner member having a surface in which a rolling member rolling surface 12 is formed, a nut member 21 as outer member having a loaded rolling surface opposing to the rolling member rolling surface 12 of the screw shaft 11, and a number of balls 31 as number of rolling members disposed between the screw shaft 11 and the nut member 21.

The screw shaft 11 is a member extending in its axial direction, and the nut member 21 is mounted to the screw shaft 11 to be reciprocal along the axial direction of the screw shaft 11 while relatively rotating. A rolling member rolling surface 12 in form of spiral is formed in an outer peripheral surface thereof so that a number of balls 31 freely roll on the rolling member rolling surface 12 while being loaded.

The nut member 21 is composed of a central nut body 23 and a pair of end caps 24, 24 as end plates disposed both end portions of the nut body 23. The nut body 23 is formed with a screw shaft through hole 25 so as to penetrate the same in the axial direction, and the screw shaft 11 is inserted into this through hole to be movable. The screw shaft through hole 25 is formed, in its inner peripheral surface, with a loaded rolling surface 22 opposing to the rolling member rolling surface 12 formed to the screw shaft 11 so that these rolling member rolling surface 12 and the loaded rolling surface 22 constitute a loaded rolling passage 26 in combination.

Further, the nut member 21 is provided with direction changing passages (rolling member rolling direction changing member) 28 formed to a non-loaded rolling passage 27 penetrating the nut body 23 and a pair of end caps 24, 24, respectively, and by connecting end portions of the loaded rolling passage 26 and the non-loaded rolling passage 27 by the direction changing passages 28, respectively, an endless circulation passage is formed by these loaded rolling passage 26, the non-loaded rolling passage 27 and a pair of direction changing passages 28, 28.

In the rolling device 10 of the first embodiment, since a number of balls 31 are disposed in the endless circulation passage, the nut member 21 performs relative rolling motion with respect to the screw shaft 11, so that the relative reciprocal motion of the nut member 21 with respect to the screw shaft 11 becomes possible.

In the above, although the main constitutional members of the rolling device according to the first embodiment, the rolling device 10 of this first embodiment achieves an advantageous function by locating a pair of end caps 24, 24 disposed to both end portions of the nut body 23. Then, the structure and the functional effects of the end cap 24 will be described in detail hereunder with reference to FIG. 2A to FIG. 6.

Figure 2A:
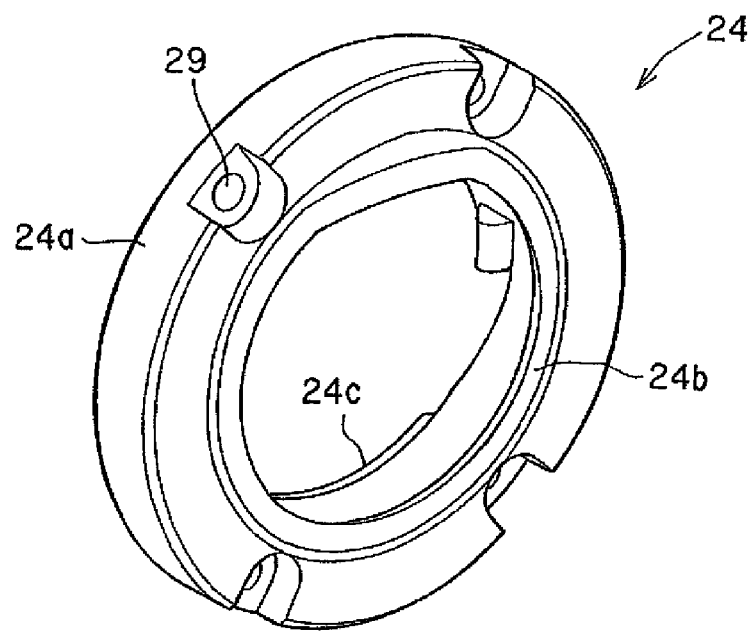
FIG. 2A is a view seen from a reverse side of a mount surface between an end cap and a nut body according to the first embodiment.
Figure 2B:
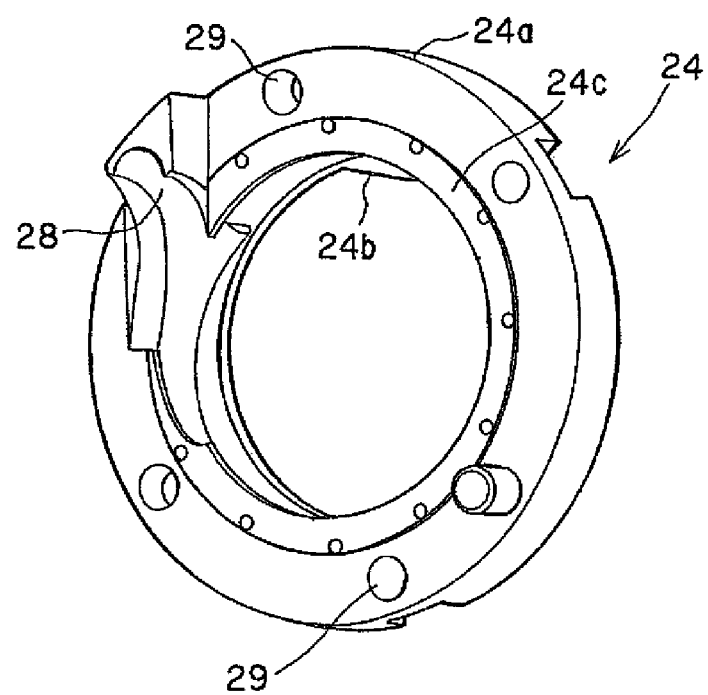
FIG. 2B is a view seen from a mount side of the mount surface between the end cap and the nut body according to the first embodiment.
Figure 2C:
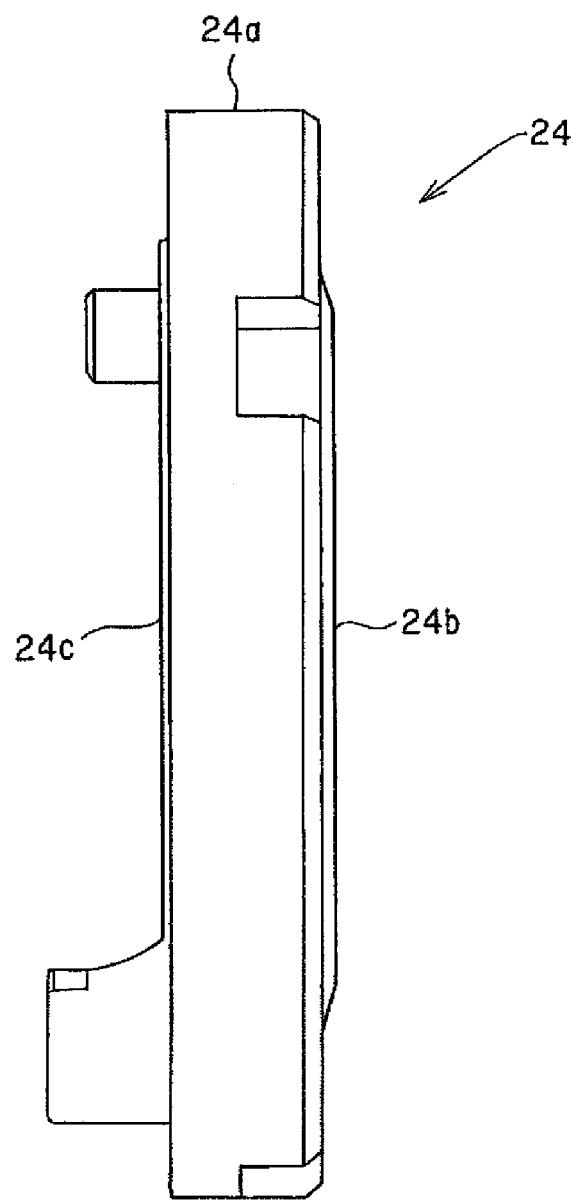
FIG. 2C is a view showing the end cap viewed from a side surface side.
Figure 3A:
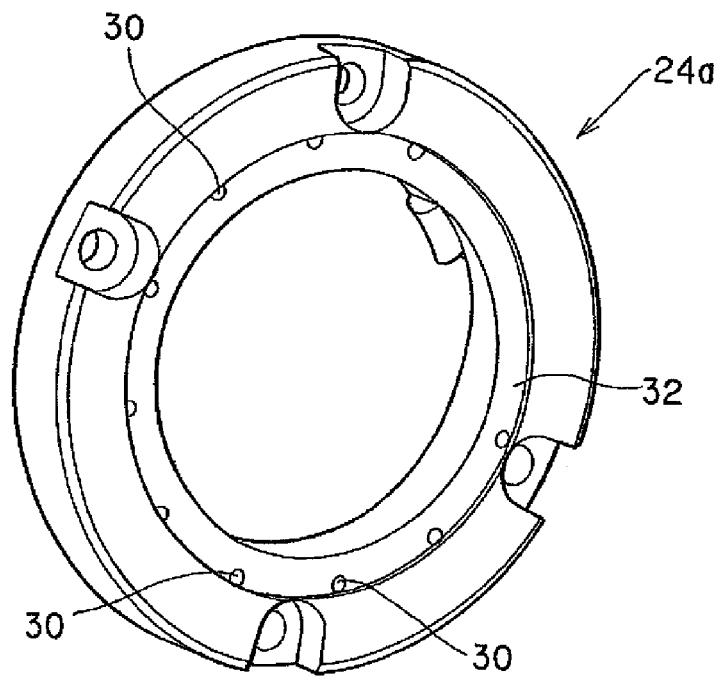
FIG. 3A is a view showing an end cap body as one constitutional member of the end cap according to the first embodiment as seen from the direction corresponding to FIG. 2A.
Figure 3B:
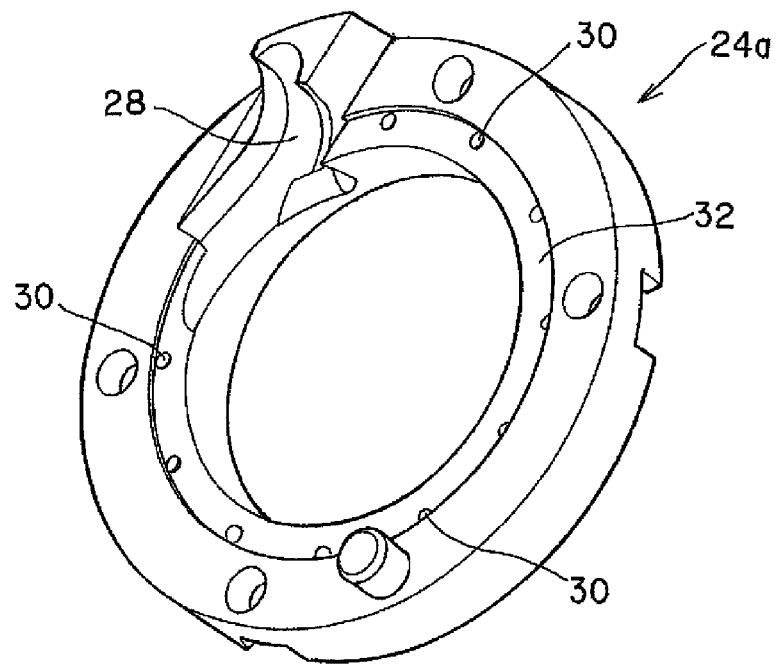
FIG. 3B is a view showing an end cap body as one constitutional member of the end cap according to the first embodiment as seen from the direction corresponding to FIG. 2B.
Figure 4:
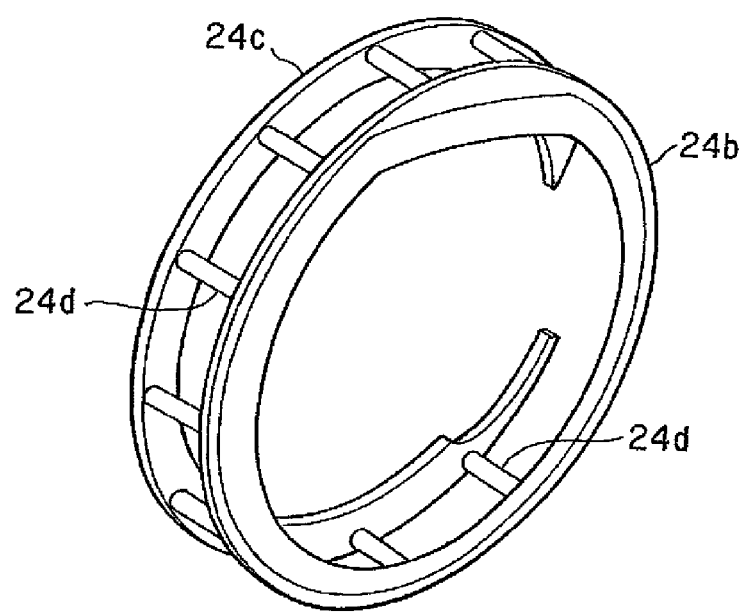
FIG. 4 shows the end cap, according to the first embodiment, which is constituted by a packing member, a seal member and a connection member, which are mounted to the end cap body.
Figure 5A:
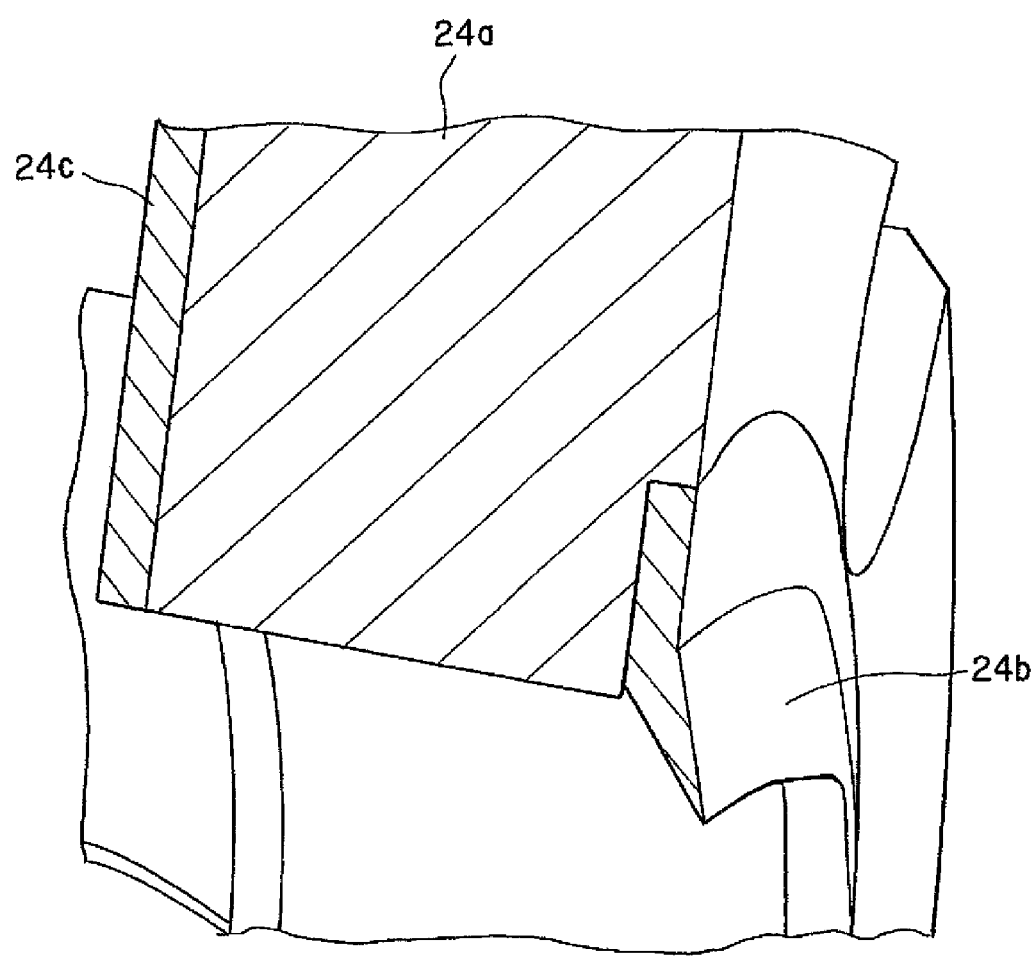
FIG. 5A is an enlarged view showing an essential portion of the end cap according to the first embodiment.
Figure 5B:
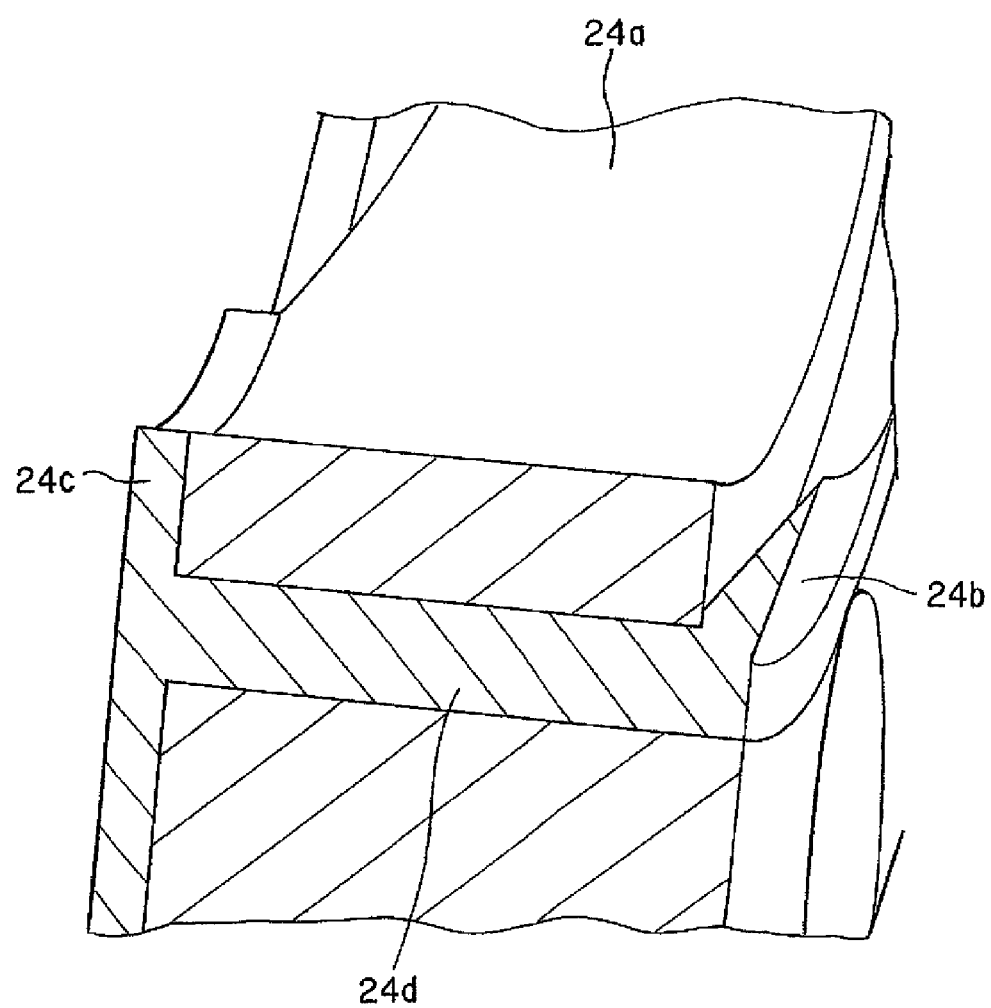
FIG. 5B is also an enlarged view showing an essential portion of the end cap according to the first embodiment.
Figure 6A:
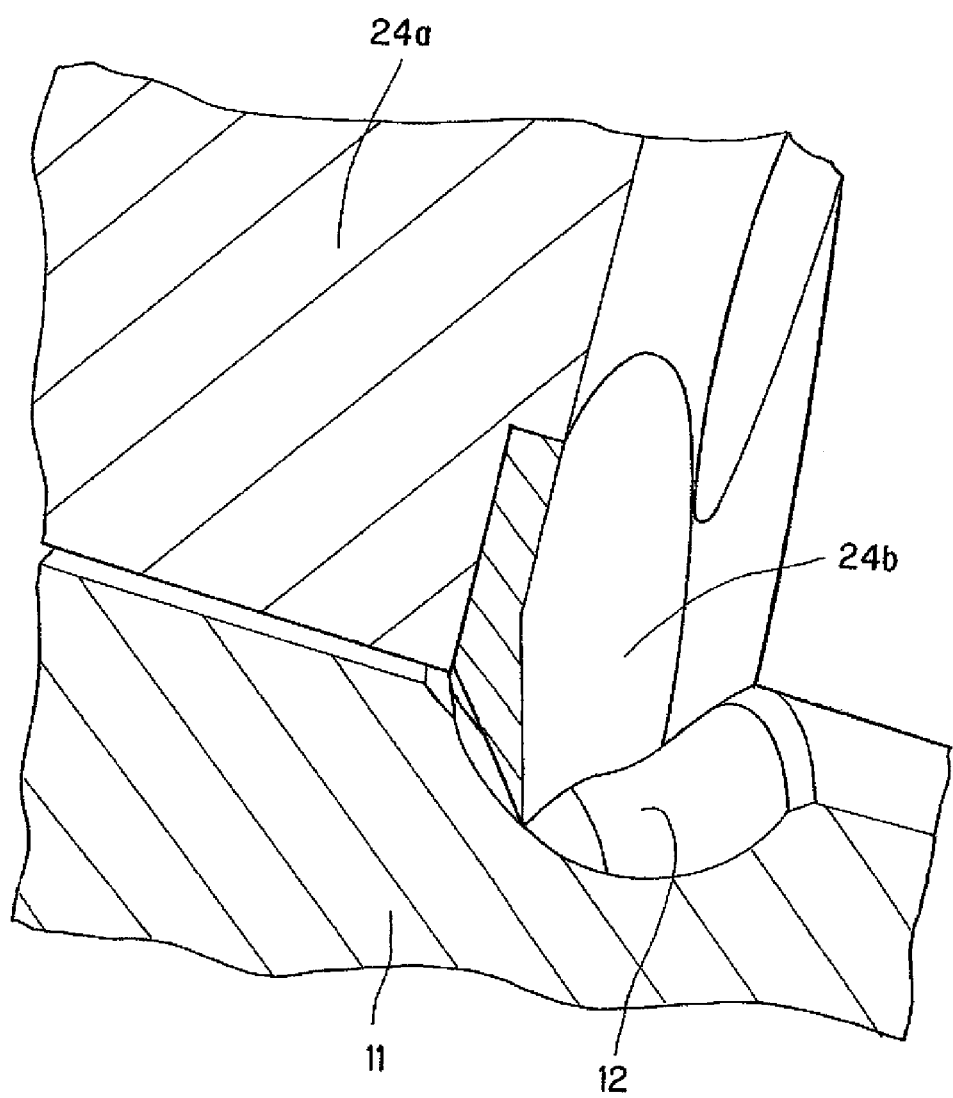
FIG. 6A is an enlarged view showing an essential portion of the end cap and the screw shaft according to the first embodiment.
Figure 6B:
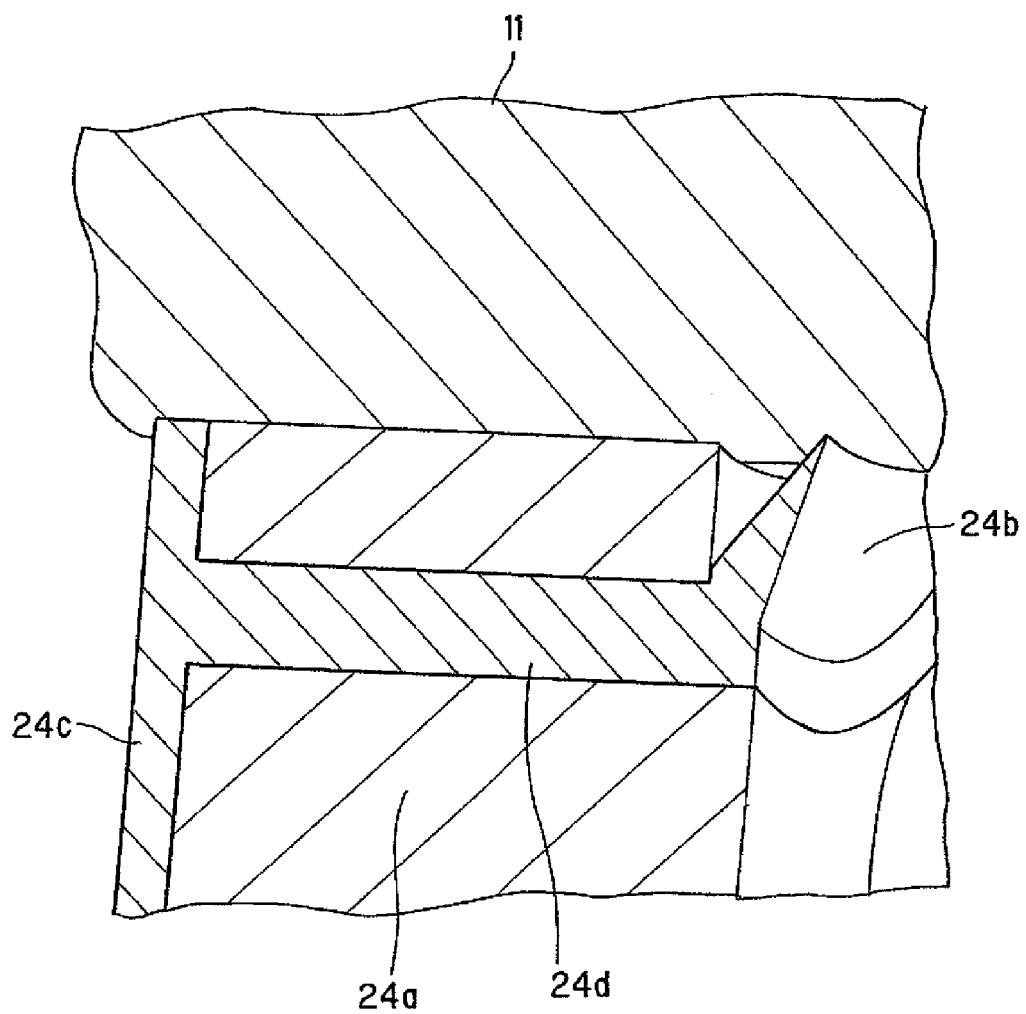
FIG. 6B is also an enlarged view showing an essential portion of the end cap and the screw shaft according to the first embodiment.

FIG. 2A is a view seen from a reverse side of a mount surface between an end cap 24 and a nut body 23 according to the first embodiment, FIG. 2B is a view seen from a mount side of the mount surface between the end cap 24 and the nut body 23 according to the first embodiment, and FIG. 2C is a view showing the end cap 24 viewed from a side surface side. Further, FIGS. 3A and 3B are views showing an end cap body 24a as one constitutional member of the end cap 24 according to the first embodiment, in which FIG. 3A is a view seen from the direction corresponding to FIG. 2A and FIG. 3B is a view seen from the direction corresponding to FIG. 2B. FIG. 4 shows the end cap 24, according to the first embodiment, which is constituted by a packing member 24c, a seal member 24b and a connection member 24d, which are mounted to the end cap body 24a. FIGS. 5A and 5B are enlarged views showing essential portions of the end cap 24, and FIGS. 6A and 6B are enlarged views showing essential portions of the end cap 24 and the screw shaft 11 according to the first embodiment.

As shown in FIG. 2A to FIG. 2C, the end cap 24 according to the first embodiment is constructed by the end cap body 24a, the packing member 24c disposed to a surface thereof abutting against the nut body 23, and the seal member 24b disposed on an end side of the nut member 21 at a portion opposite to the packing member 24c.

As shown in detail in FIG. 2B, the end cap 24 is formed with a direction changing passage 28 on the abutment surface side to the nut body 23 so as to receive rolling load repeatedly from a number of balls 31. Accordingly, a resin material having hard quality such as TORAYCA (Registered Trademark of TORE KABUSHIKI KAISHA) to be capable of receiving and bearing such repeated rolling load.

However, in the structure in which only the end cap body 24a is connected to the nut body 23 as in the conventional technology, noise leaks from a clearance or gap between the end cap body 24a and the nut body 23 and a clearance or gap between the end cap body 24a and the screw shaft 23. Then, in the end cap 24 of this first embodiment, a structure, in which the packing member 24c and the seal member 24b are formed to the end cap body 24a, is adopted.

The packing member 24c is a member sandwiched in position between the end cap body 24a and the nut body 23, and the surface of the packing member 24c is slightly protruded over a surface of the nut body 23 opposing to the end cap body 24a (refer to FIG. 2C). Furthermore, the packing member 24c is formed of a soft material such as elastomer softer than a material forming the end cap body 24c. These structures are adopted for the reasons that when the end cap 24 is mounted to the nut body 23, the packing member 24c formed of a soft material is slightly pressed and deformed to thereby completely seal the clearance formed at the mount surface between the nut body 23 and the end cap 24.

Still furthermore, the packing member 24c is disposed to only an area near the inner peripheral side of the end cap body 24a having a ring shape as shown in detail in FIG. 2B. This is made according to an intention to allow a bolt hole 29 to be formed for the effective utilization at a time of fixing the end cap body 24a to the nut body 23. That is, if the packing member 24c formed of a soft material such as elastomer exists near the bolt hole 29, the fastening force by a bolt, not shown, to be screwed with the bolt hole 29 may be dispersed, and hence, weakened, by the location of the packing member 24c. Then, the location of the packing member 24c with respect to the end cap body 24a is made so as to avoid the location of the bolt hole 29 so that all the fastening force by the bolt is entirely applied for this fastening function to the end cap body 24a and the nut body 23, and the packing member 24c is, on the other hand, utilized only for surely sealing the gap between the end cap body 24a and the nut body 23. According to such structure, the leakage of the noise from the inside of the nut body 23 can be prevented by the packing member 24c, thus improving and enhancing the silencing effect of the rolling device.

On the other hand, the seal member 24b is a member disposed in opposition to the packing member 24c of the end cap body 24c. The specific and effective feature of the seal member 24b resides in its inner peripheral shape, and as shown in FIG. 2A, the inner peripheral shape of the seal member 24b has no true circular shape and is formed so as to provide a shape corresponding to a section taken perpendicularly to the screw shaft 11. That is, the inner peripheral shape of the seal member 24b is intended to slidably contact the outer surface of the screw shaft 11 with no clearance or gap.

Further, the seal member 24b is formed from a soft material such as elastomer like the packing member 24c. According to the structure of the seal member 24b mentioned above, the seal member 24b can surely clog or seal the clearance existing between the nut body 23 and the screw shaft 11, which can be always maintained at a time of relative movement between the nut body 23 and the screw shaft 11. By locating such seal member 24b, the noise between the nut body 23 and the screw shaft 11 can be prevented form leaking outward, thus enhancing the silencing effect of the rolling device 10.

Further, it is to be noted that it is preferred for the seal member 24b and the packing member 24c to be formed from the same material and for the end cap 24 to be formed integrally through two-color formation process (or two-color molding process). As a structure for realizing such two-color formation, for example, as shown in FIGS. 3A to 4, a plurality of through holes 30 are formed to the end cap body 24a, and the seal member 24b and the packing member 24c are connected and coupled together through a plurality of connection members 24d penetrating the through holes 30, respectively. For example, when it is required to form the end cap body 24a with a hard resin material and the seal member 24b and the packing member 24e are formed of an elastomer through the two-color formation process, if two kinds of materials are the combination hard to be joined, it may be necessary to adopt any integrating means for maintaining the integrated shape after the integration. As such integrating means, in this first embodiment, there is adopted the structure in which a plurality of through holes 30 and a plurality of connection members 24d penetrating these through holes 30 are provided. According to such integrating means, the firm integration between the seal member 24b and the packing member 24c with respect to the end cap body 24a can be maintained, thereby always attaining the silencing effect. Moreover, the adoption of two-color formation process makes it possible to easily perform manufacturing processing and reduce manufacturing cost, thus being effective and advantageous.

Furthermore, as a preferable example to be taken by the end cap body 24a at the time of the two-color formation process, it is preferred (see FIGS. 3A and 3B) to form recessed portions 32 at positions of the end cap body 24a to which the seal member 24b and the packing member 24c are formed so as to be fitted into the recessed portions to realize the integral structure. By providing such recessed portions 32, the seal member 24b and the packing member 24c can be more stably located to the end cap body 24a, and hence, the silencing effect by the end cap 24 can be surely realized as well as realizing extension of life time of the end cap 24.

Incidentally, in the conventional technology, since the seal member and the end cap were formed of materials different from each other, it was difficult to make compact the structures of the seal member like the seal member 24b in the first embodiment described above. However, according to the end cap 24 of the first embodiment, since the end cap body 24a, the seal member 24b and the packing member 24c can be integrally formed, it becomes possible to manufacture the end cap with extremely small dimension, and the realization of such small-sized end cap 24 can easily ensure the location spaces of the seal member 24b and the packing member 24c, thus improving design freedom, and realizing compact and light-weighed structure of the rolling device itself.

Further, since it is necessary to locate the seal member 24b to be tightly contacted to be slidable with respect to the outer surface of the screw shaft 11, as shown in FIGS. 5A and 5B, the seal member 24b is formed have a tip (front) end sharpened toward outward of the nut body 23. According to the effects obtained by such sharpened shape and elasticity of the soft material such as elastomer, the sealing performance of the seal member 24b with respect to the screw shaft 11 can be further improved (see FIG. 6A).

Furthermore, this seal member 24b further attains effects of preventing lubricating agent filling the interior of the nut body 23 from leaking externally outward and also preventing foreign material from invading inside the nut member 21, thereby contributing the realization of the preferable operation and extended life time of the rolling device 10. According to such integrating structure, any position alignment working of the seal member 24b to the rolling member rolling passage 12 provided for the screw shaft 11 can be eliminated, thus improving the productivity.

On the other hand, the packing member 24c only acts to surely close (clog) the clearance existing between the end cap body 24a and the nut body 23, and accordingly, as shown in FIGS. 5A and 5B, the inner peripheral side of the packing member 24c, as viewed from the axial direction, is formed so as not to protrude over the end cap body 24a. Accordingly, as detailed shown in FIG. 6B, the packing member 24c is disposed with a predetermined distance from the outer surface of the screw shaft 11 so as not to be contacted thereto in the mounting condition of the packing member 24c.

Further, the thickness of each of the packing member 24c and the seal member 24b may be optionally determined, but it is desirable that, as to the thickness protruding from the end cap body 24a, the thickness of the packing member 24c has thinner than the thickness of the seal member 24b. This is because that if the packing member 24c has a large thickness, it is difficult for the packing member 24c to effectively attain the packing function. On the contrary, as to the seal member 24b, it is desirable to have the thickness of a range not to disturb the rotating motion of the screw shaft 11 for the improvement of the sealing performance.

Second Embodiment

In the rolling device 10 according to the first embodiment mentioned above, there is explained, as an example, that a pair of end plates disposed to both the end portions of the nut body 23 are constructed as end caps 24 having direction changing passages 28. However, the present invention is not limitedly applied to so-called end cap-type ball screw device, and is applicable to various kinds or types of rolling devices. Accordingly, in the second embodiment described hereunder, an embodiment in which the present invention is applied to a ball screw device using no end cap 24. It is further to be noted that like or same reference numerals are added to members or portions corresponding to those of the first embodiment and the detailed explanations thereof are omitted herein.

Figure 7:
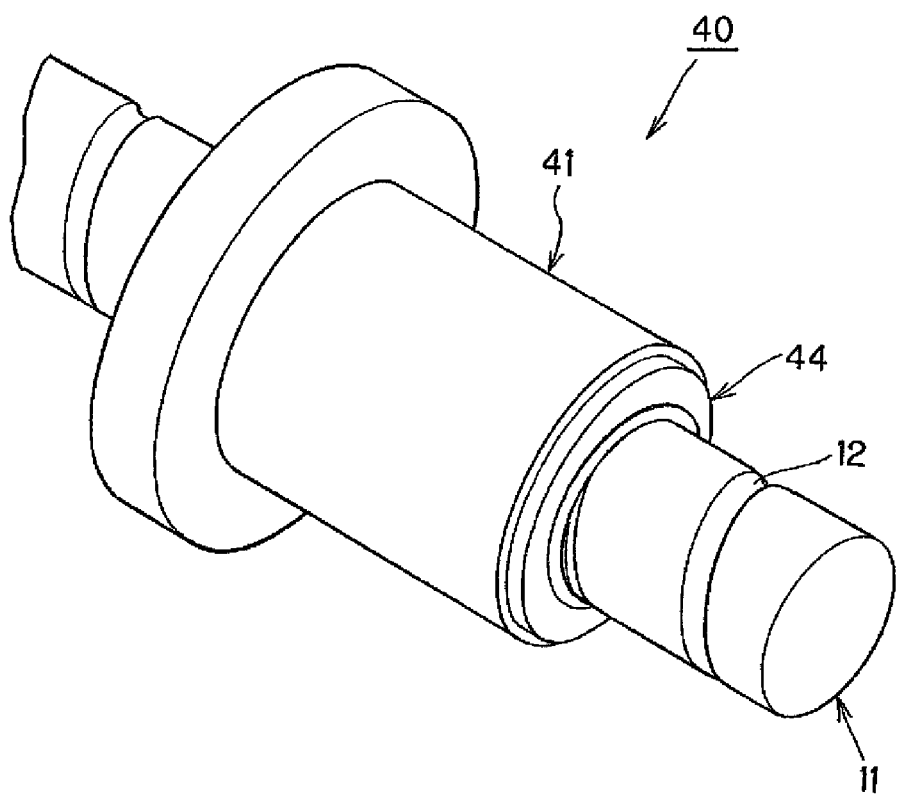
FIG. 7 is a perspective view showing outer configuration of a rolling device according to a second embodiment of the present invention.

FIG. 7 is a perspective view showing an outer configuration of a rolling device 40 according to the second embodiment, and the rolling device 40 of this embodiment is provided with the endless circulation passage formed within a nut member 41. Accordingly, with the nut member 41 of this second embodiment, a rolling passage for the balls 31 is formed in a sealed state within the nut member 41, and noise generated inside the nut member 41 leaks through a clearance between the nut member 41 and the screw shaft 11.

Then, in the rolling device 40 according to the second embodiment shown in FIG. 7, a pair of end plates 44 are disposed to both end portions of the nut member 41 to thereby close the clearance between the nut member 41 and the screw shaft 11. As shown in FIG. 7, these end plates 44 are disposed in a state fitted into recessed portions formed to both the end portions of the nut member 41. The end plate 44 is also provided with a function for preventing a clearance in a mounting surface between the end plate and the nut member 41 from being formed, and according to such structure, the silencing effect of the rolling device 40 can be enhanced. The details of the end plate 44 according to the second embodiment will be further explained with reference to FIGS. 8A to 12B.

Figure 8A:
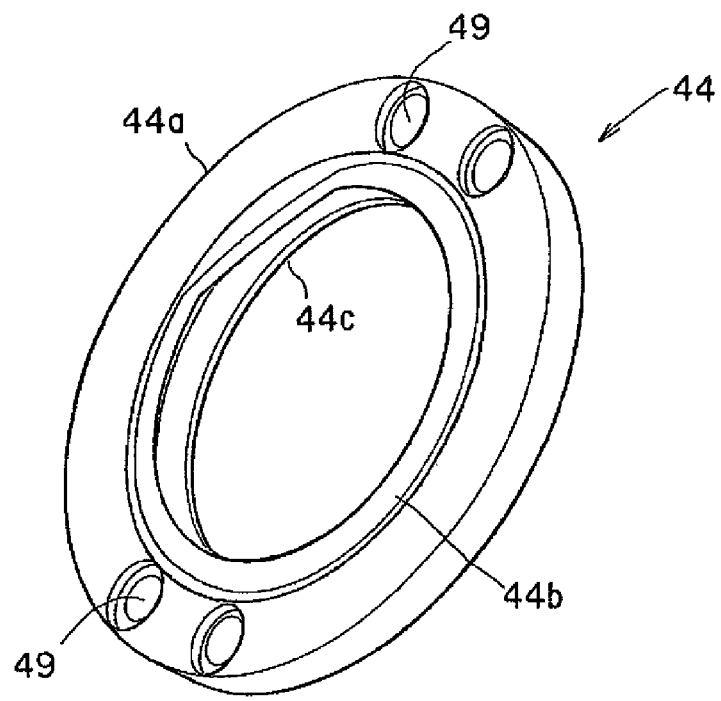
FIG. 8A is a view seen from a reverse side of a mount surface between an end plate and a nut member according to the second embodiment.
Figure 8B:
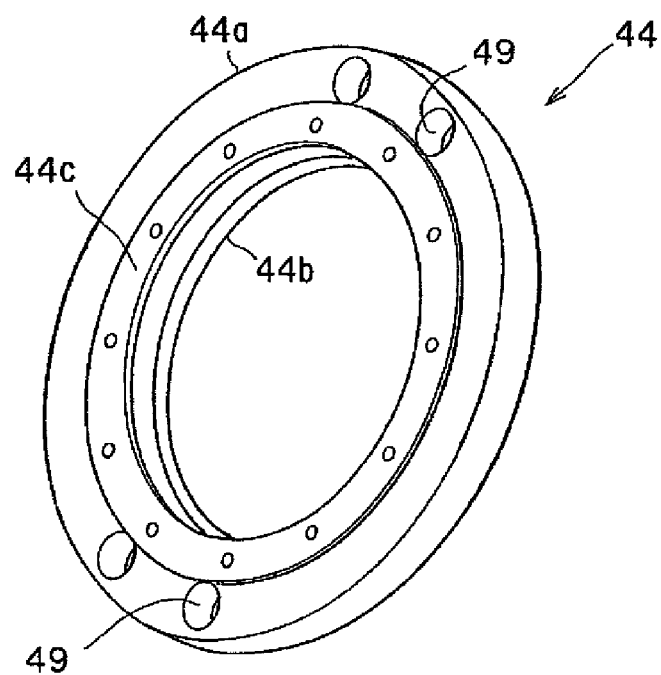
FIG. 8B is a view seen from a mount side of the mount surface between the end plate and the nut member according to the second embodiment.
Figure 8C:
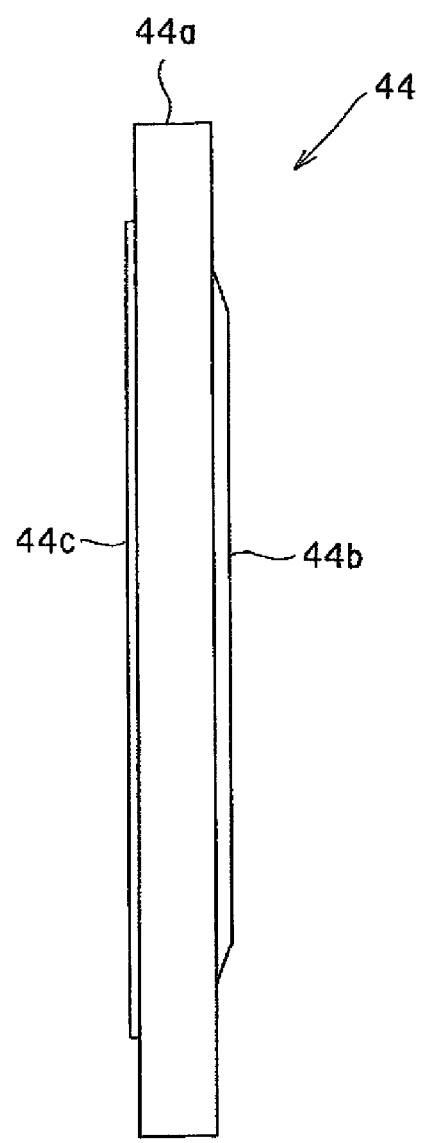
FIG. 8C is a view showing the end plate viewed from a side surface side.
Figure 9A:
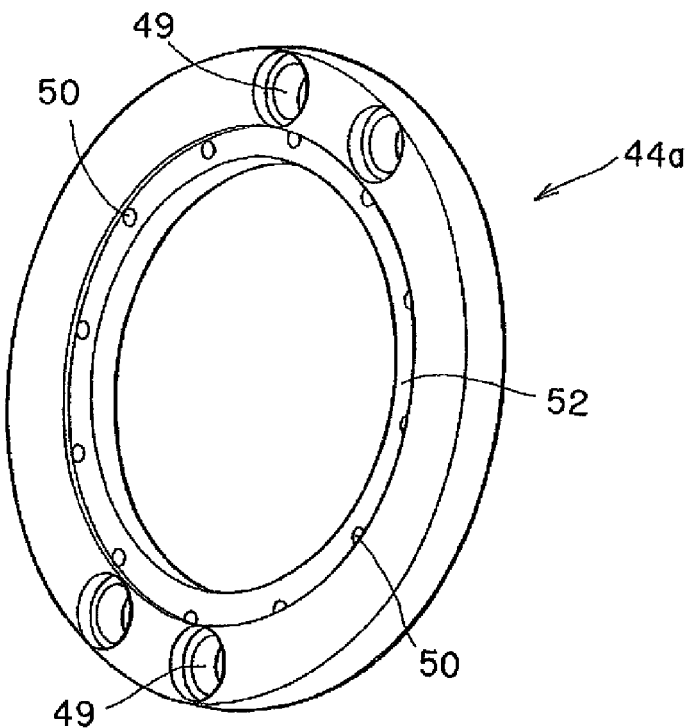
FIG. 9A is a view showing an end plate body as one constitutional member of the end plate according to the second embodiment as seen from the direction corresponding to FIG. 8A.
Figure 9B:
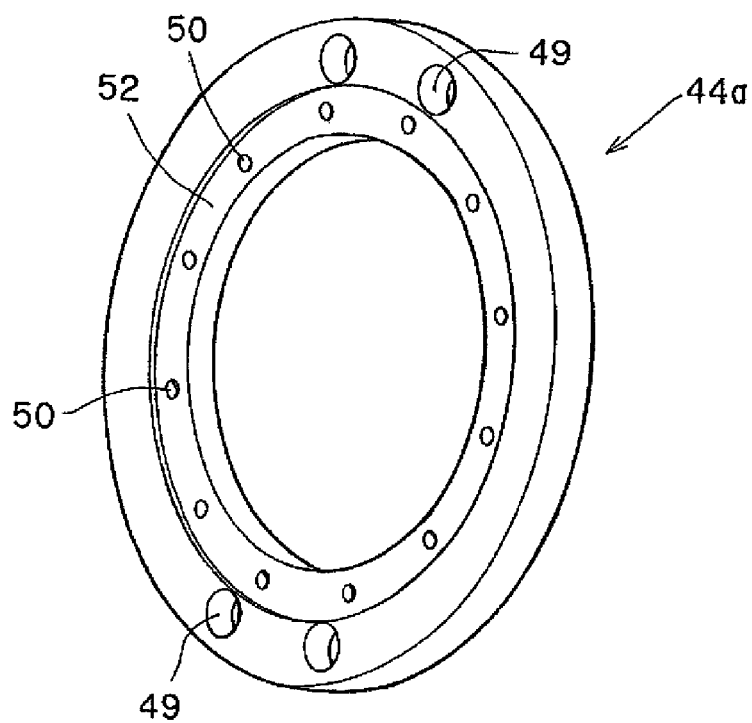
FIG. 9B is a view showing an end plate body as one constitutional member of the end cap according to the second embodiment as seen from the direction corresponding to FIG. 8B.

FIG. 8A is a view seen from a reverse side of a mount surface between the end plate 44 and the nut member 41 according to the second embodiment, FIG. 8B is a view seen from a mount side of the mount surface between the end plate 44 and the nut member 41 according to the second embodiment, and FIG. 8C is a view showing the end plate 44 viewed from a side surface side. FIGS. 9A and 9B are views showing an end plate body 44a as one constitutional member of the end plate 44 according to the second embodiment, in which FIG. 9A is a view seen from the direction corresponding to FIG.

Figure 10:
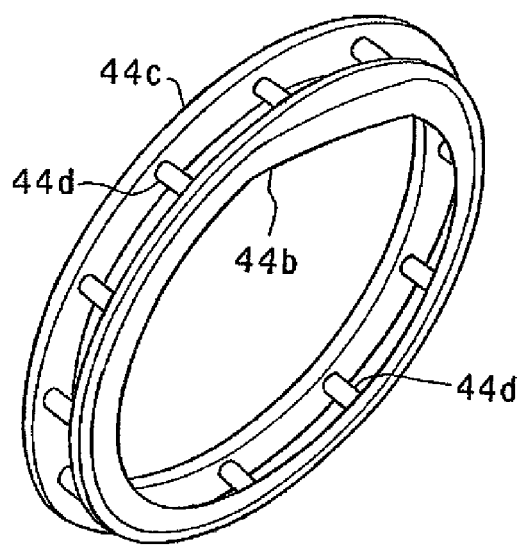
FIG. 10 shows the end plate, according to the second embodiment, which is constituted by a packing member, a seal member and a connection member, which are mounted to the end plate body.
Figure 11A:
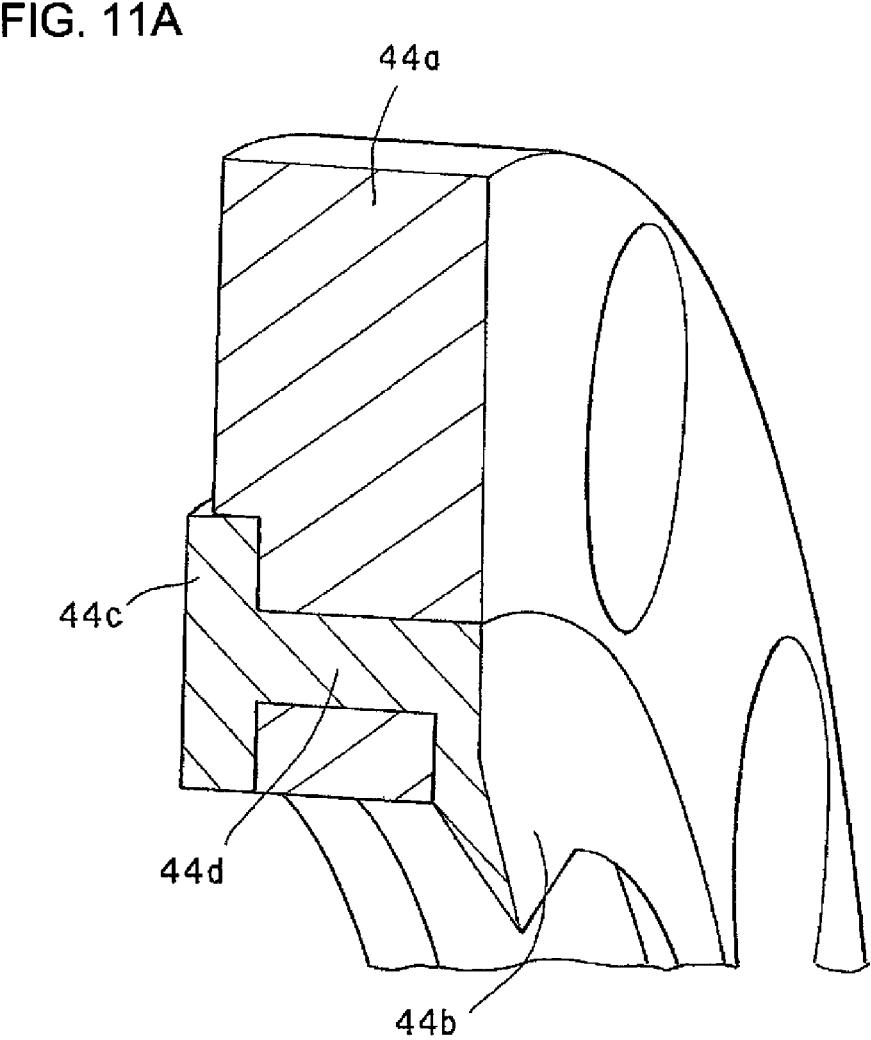
FIG. 11A is an enlarged view showing an essential portion of the end plate according to the second embodiment.
Figure 12A:
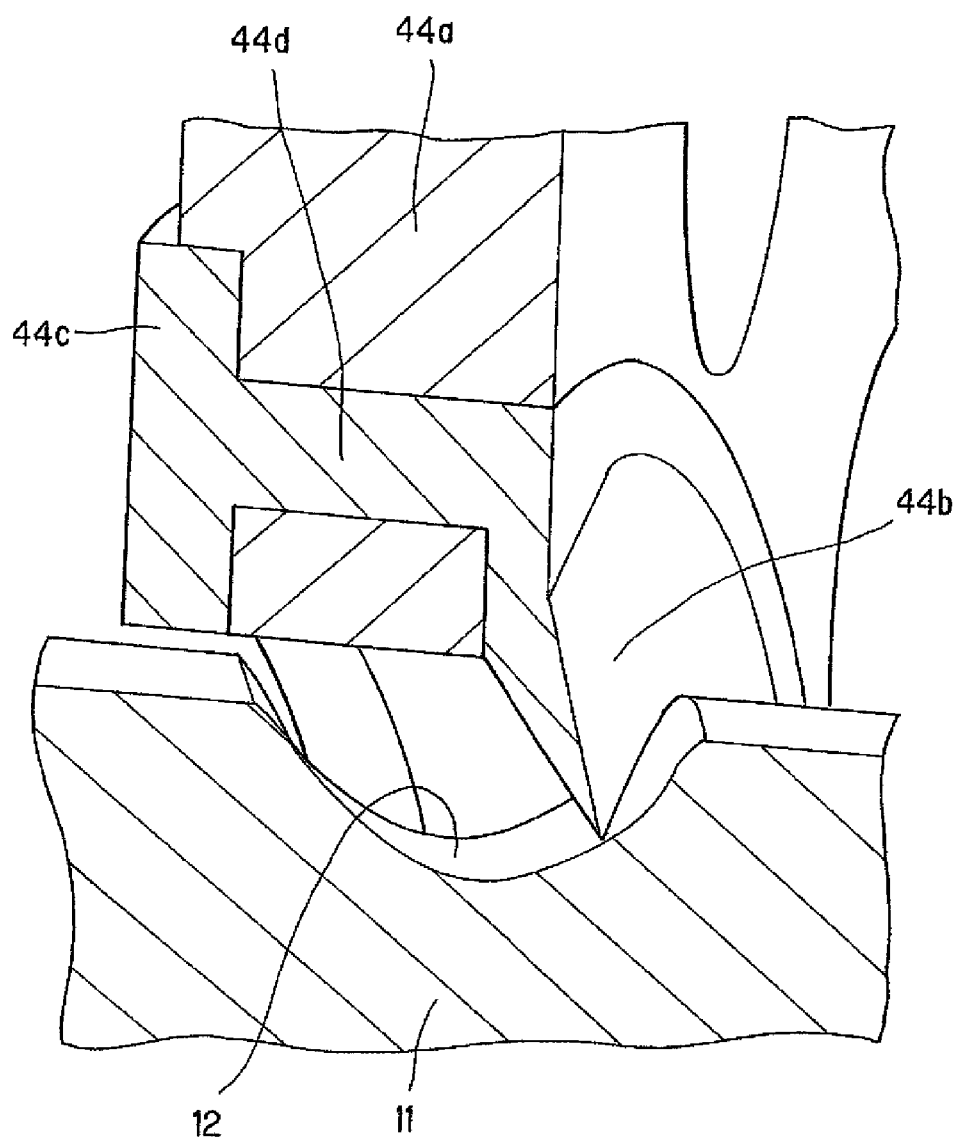
FIG. 12A is an enlarged view showing an essential portion of the end plate and the screw shaft according to the second embodiment.
Figure 12B:
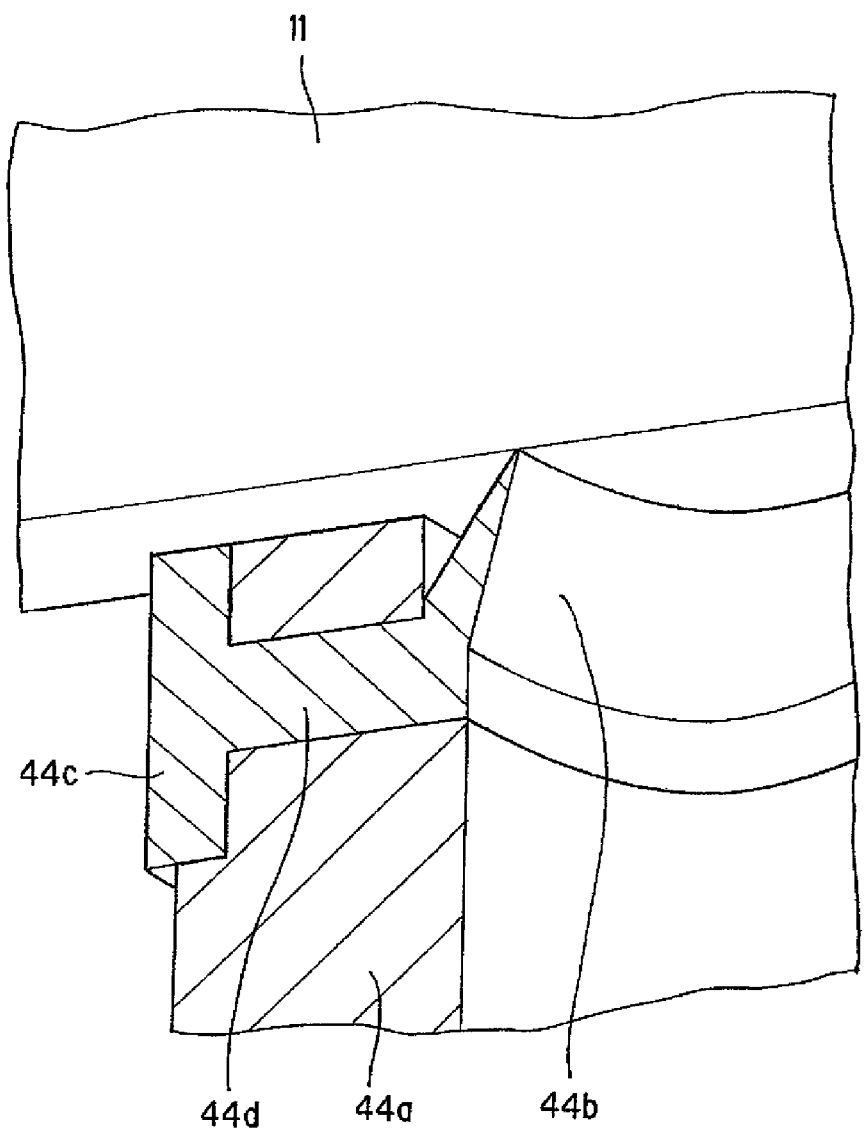
FIG. 12B is also an enlarged view showing an essential portion of the end plate and the screw shaft according to the second embodiment.

8A, and FIG. 9B is a view seen from the direction corresponding to FIG. 8B. FIG. 10 shows the end plate, according to the second embodiment, which is constituted by a packing member 44c, a seal member 44b and a connection member 44d, which are mounted to the end plate body 44a. FIGS. 11A and 12B are views, in an enlarged scale, showing an essential portion of the end plate 44 according to the second embodiment. FIGS. 12A and 12B are views, in an enlarged scale, showing an essential portion of the end plate 44 and the screw shaft 11 according to the second embodiment.

As shown in FIGS. 8A to 8C, the end plate 44 according to the second embodiment is composed of the end plate body 44a, the packing member 44c disposed on the surface abutting against the nut member 41, and the seal member 44b disposed on the opposite side thereof. The end plate 44 of the second embodiment is not provided with any direction changing passage such as passage 28 in the first embodiment, and the end plates 44 is disposed only for mounting the packing member and the seal member.

The packing member 44c is a member disposed in a manner sandwiched between the end plate body 44a and the nut member 41 in a fashion such that the surface of the packing member 44c slightly protrudes toward the location side of the nut member 41 over the side surface of the location side of the nut member 41 in the end plate 44a (see FIG. 8C). Further, the packing member 44c is formed of a soft material such as elastomer softer than a hard resin material forming the end plate body 44a, for example. These structures are adopted for the reason such that when the end plate 44 is mounted to the nut member 41, the packing member 44c formed of a soft material is pressed and slightly deformed, and the clearance or gap generated between the nut member 41 and the mount surface of the end plate 44 is completely closed and sealed.

Furthermore, the packing member 44c is, as shown in detail in FIG. 8B, disposed only within a region near the inner peripheral side of the ring-shaped end plate body 44a. This intends to avoid the location of bolt holes 49 for fastening the end plate 44 to the nut member 41. That is, in a case if the packing member 44c formed of a soft material such as elastomer exists near the periphery of the bolt hole 49, the fastening force of a bolt, not shown, screwed with the bolt hole 49, is dispersed by the location of the packing member 44c and hence weakened. Therefore, in order that all the fastening force by the bolt, not shown, is applied only to the end plate body 44a and the nut member 41 so that the packing member 44 is utilized only for closing the clearance between the end plate body 44a and the nut member 41, and the disposing area of the packing member 44c with respect to the end plate body 44a is formed so as to avoid the location of the bolt holes 49. According to such structure, since the end plate 44 can be surely mounted with no clearance, the rolling device 40 performing the high silencing effect can be realized and provided.

On the other hand, the seal member 44b is a member disposed on the side opposite to the location side of the packing member 44c to the end plate body 44a. The effective subject feature of the seal member 44b resides in its inner peripheral shape, and as shown in FIG. 8A, the inner periphery of the seal member 44b is not formed into a true circular shape and is formed into a shape corresponding to the axially perpendicular sectional shape of the screw shaft 11. That is, the inner peripheral shape of this seal member 44b is formed so as to satisfy the intension such that the seal member 44b can slidably contact the outer surface of the screw shaft 11 with no clearance. Further, the seal member 44c is preferably formed of a soft material such as elastomer as like as the packing member 44c. According to the structure mentioned above, the seal member 44b can surely close and seal the clearance existing between the nut member 41 and the screw shaft 11, and this sealing function can be always kept during the period of the relative motion between the nut member 41 and the screw shaft 11. Such structure can realize the prevention of noise from leaking between the nut member 41 and the screw shaft 11, thus enhancing the silencing effect of the rolling device 40.

Furthermore, the seal member 44b and the packing member 44c may be preferred to be formed of the same material and to form the end plate 44 integrally with each other through the two-color formation process (molding process). The structure for realizing such two-color formation will be realized, for example, as shown in FIG. 9A to FIG. 10, in a manner such that a plurality of through holes 50 are formed in the end plate body 44a, and a plurality of connection members 44d are disposed so as to penetrate these through holes 49 and to couple and connect the seal member 44b and the packing member 44c through the connection members 44d. For example, the end plate body 44a is formed of a hard resin material, and when the seal member 44b and the packing member 44c are formed as elastomer through the two-color formation, if these two kinds of resin materials are hard to be joined together in combination, in order to maintain the integral shape after the two-color formation (molding), it should be necessary to adopt certain integrating means.

In consideration of this matter, in this second embodiment, as such integrating means, there is adopted a structure utilizing the plurality of through holes 49 and the connection members 44d penetrating the through holes 49. According to such integrating structure, the integrated state of the seal member 44b and the packing member 44c with respect to the end plate body 44a can be surely maintained, thus always performing the silencing effect, and in addition, by the adoption of such two-color formation, the manufacturing process can be simplified and manufacturing cost can be reduced, thus being effective.

Furthermore, in a preferred example for the formation of the end plate body 44a at the time of performing the two-color formation, it may be desirable (as shown in FIGS. 9A and 9B) to preliminarily form recessed portions 52 to the end plate body 44a at positions corresponding to the locations of the seal member 44b and the packing member 44c so that these members can be fitted and mounted thereto, thus providing the integrated structure. According to formation of such recessed portions 52, the seal member 44b and the packing member 44c can be further stably mounted with respect to the end plate body 44a, thus surely attaining the silencing function and realizing the extension of life time of the end plate 44.

Figure 11B:
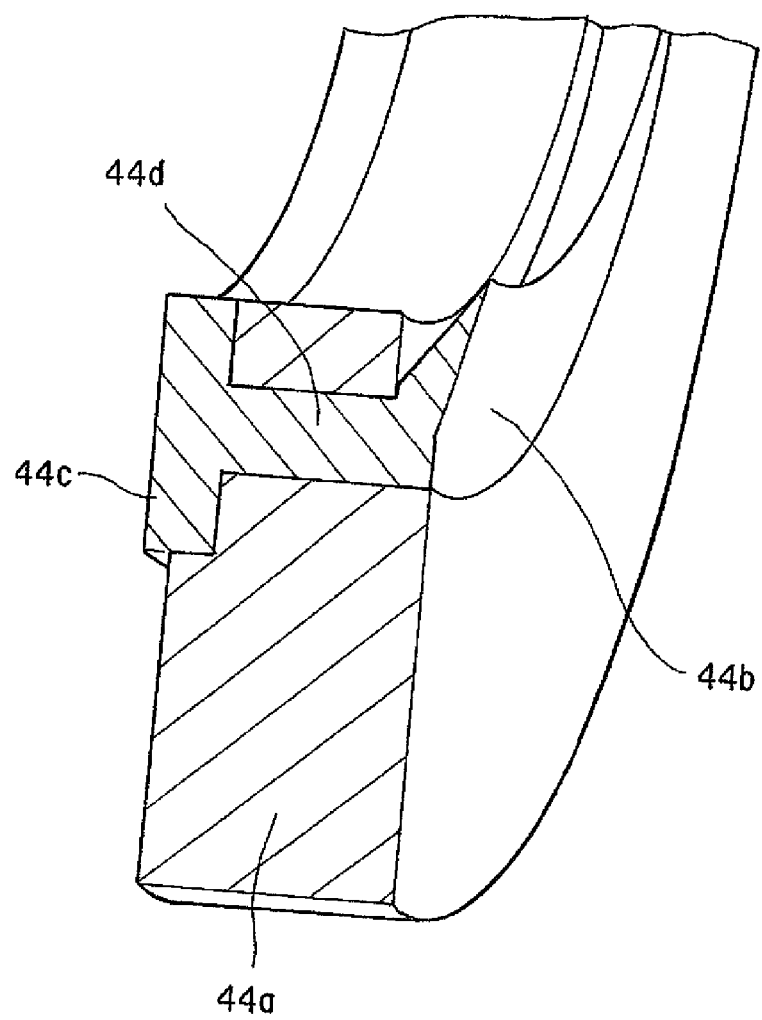
FIG. 11B is also an enlarged view showing an essential portion of the end plate according to the second embodiment.

Further, since it is necessary for the seal member 44b to closely slidably contact the outer surface of the screw shaft 11, as shown in FIGS. 11A and 11B, the seal member 44b is formed such that the tip end portion is sharpened toward outward of the nut member 41. According to the combined effect of such sharpened shape and the elasticity of the soft material such as elastomer, the sealing performance with respect to the screw shaft 11 can be further improved (see FIG. 12A).

Moreover, the seal member 44b further attains the effects of preventing the lubricating agent filling the interior of the nut member 41 from leaking outward and preventing foreign material from entering the interior of the nut member 41 from the outside thereof, these effects contributing to the realization of preferred operations and functions of the rolling device 40 and the extension of its life time. According to such integrating structure, there is no need of positional alignment working of the seal member 44b with respect to the rolling member rolling passage 12 formed to the screw shaft 11 to thereby improve the productivity.

On the other hand, the function or role of the location of the packing member 44c merely resides in the sure closing of the clearance existing between the end plate body 44a and the nut member 41, and accordingly, as shown in FIGS. 11A and 11B, the inner peripheral side of the packing member 44c is formed so as not to protrude outward from the end plate body 44a. Accordingly, as shown in detail in FIG. 12, the packing member 44c is disposed with a predetermined distance from the outer surface of the screw shaft 11 so as not to contact the surface in the mounting state of the packing member 44c.

Third Embodiment

In the above, although the embodiments of the ball screw devices of various types, to which the present invention is applied, are described hereinbefore, the present invention is not limited to the ball screw devices, and can be applied to every rolling device. Then, hereunder, in a third embodiment, an example in which the present invention is applied to a linear guide device will be explained.

Figure 13:
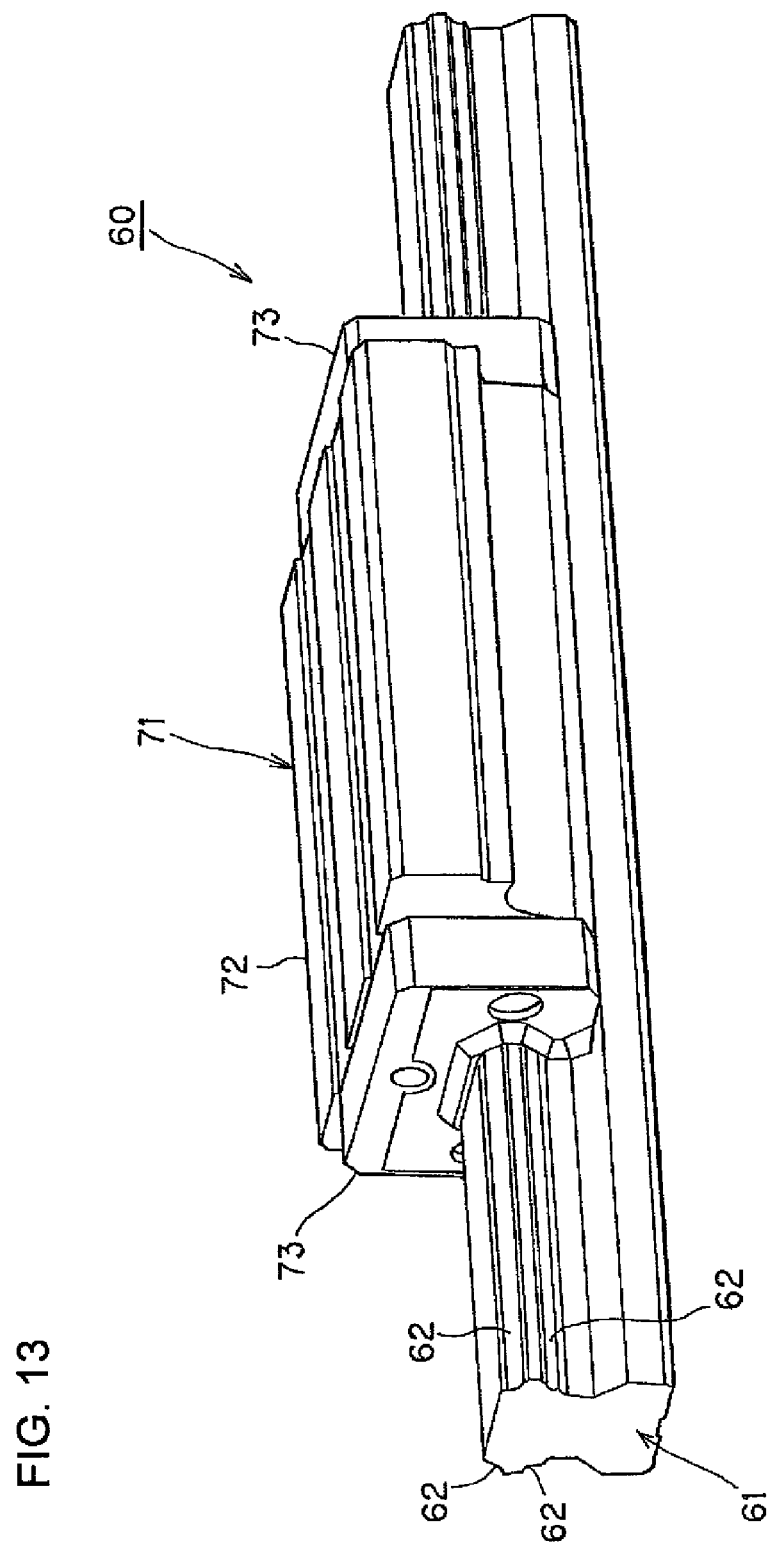
FIG. 13 is a perspective view showing an outer configuration of a linear guide device as a rolling member according to a third embodiment of the present invention.

FIG. 13 is a perspective view showing an outer configuration of a linear guide device 60 as a rolling device according to the third embodiment of the present invention.

The linear guide device 60 according to the third embodiment is provided with a track rail 61 as inner member and a movable block 71 as outer member mounted to the track rail 61 to be movable through balls, not shown, as rolling members.

The track rail 61 is a member having an extending scale in its longitudinal direction and having approximately rectangular cross section, and a loaded rolling groove 62 is formed to the outer surface of the track rail 61 so as to extend entirely along the longitudinal direction of the track rail so that the balls can roll along the rail. In the case of the linear guide device 60 shown in FIG. 13, four rows (threads), in total, of such loaded rolling grooves 62 are formed to the outer surface of the track rail 61.

The movable block 71 is composed of a block body 72 formed of a material having high strength such as steel and a pair of end plates 73, 73 disposed to both end sides of the block body 72. The paired end plates 73, 73 are fastened to both the end portions of the block body 72 by means of bolts, thus constituting the movable block 71.

The block body 72 is formed with four rows of loaded rolling grooves respectively facing the loaded rolling grooves 62 formed to the track rail 61, and four loaded rolling passages are formed between the track rail 61 and the movable block 72 by the combination of these loaded rolling grooves. Further, four return passages are formed to the block body 72 so as to respectively extend in parallel with the loaded rolling passages, and a pair of ball guide portions protruding in arched-shape between the loaded rolling grooves and the return passages are formed to both the end surfaces of the block body 72. Furthermore, the end plate 73 is formed with a ball guide groove 74 recessed in arched-shape corresponding to each of the ball guide portions.

The ball guide portion and the ball guide groove 74 are combined and assembled by fixing the end plate 73 to the block body 72, and a rolling member rolling direction changing passage (called direction changing member, hereinafter) formed so as to provide U-shape is formed between the ball guide portion and the ball guide groove 74 so as to communicate (connect) the loaded rolling passage and the return passage. The return passage and the direction changing passage constitute, in combination, a non-loaded ball rolling passage, and this non-loaded rolling passage and the loaded rolling passage constitute, in combination, an endless circulation passage. The sectional shape and dimension of the endless circulation passage are designed so as to describe a circular section having the same diameter as that of the ball in the loaded rolling passage and to describe a circular section having a diameter slightly larger than that of the ball in the non-loaded rolling passage.

In the linear guide device 60 according to the third embodiment of the structure mentioned above, each of the end plates 73 is provided, for enhancing the silencing effect of the linear guide device 60, with a packing member 73c on the location side of the block body 72 and a seal member 73b on the side opposite to the packing member 73c.

The detail of this end plate 73 according to the third embodiment will be explained hereunder with reference to FIG. 14A to FIG. 16.

Figure 14A:
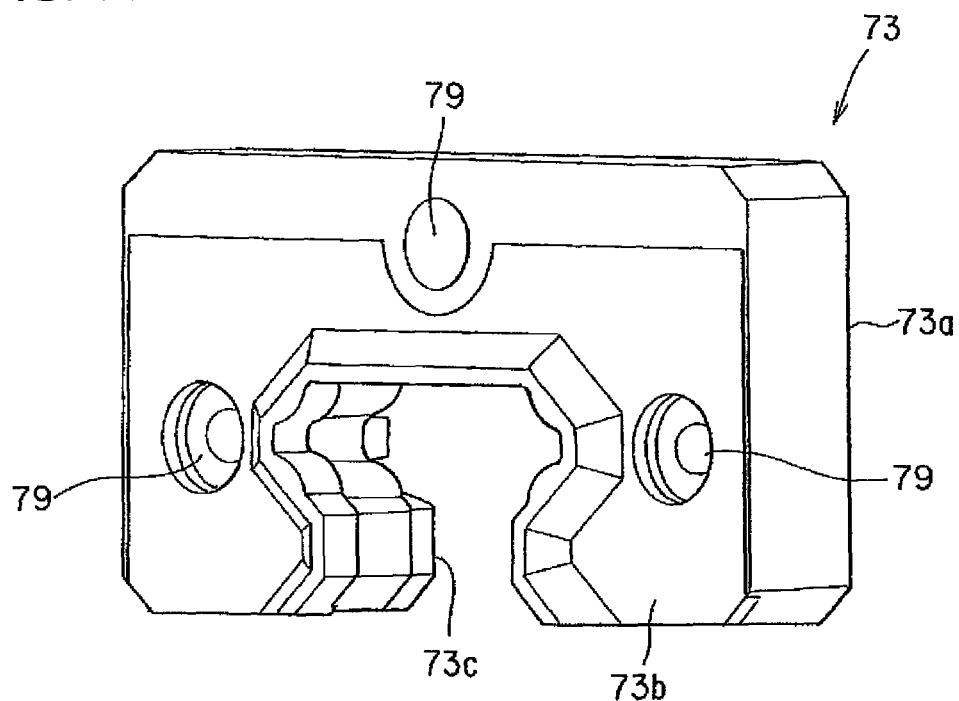
FIG. 14A is a view of an end plate according to the third embodiment seen from a reverse side of a mount surface side of a block body.
Figure 14B:
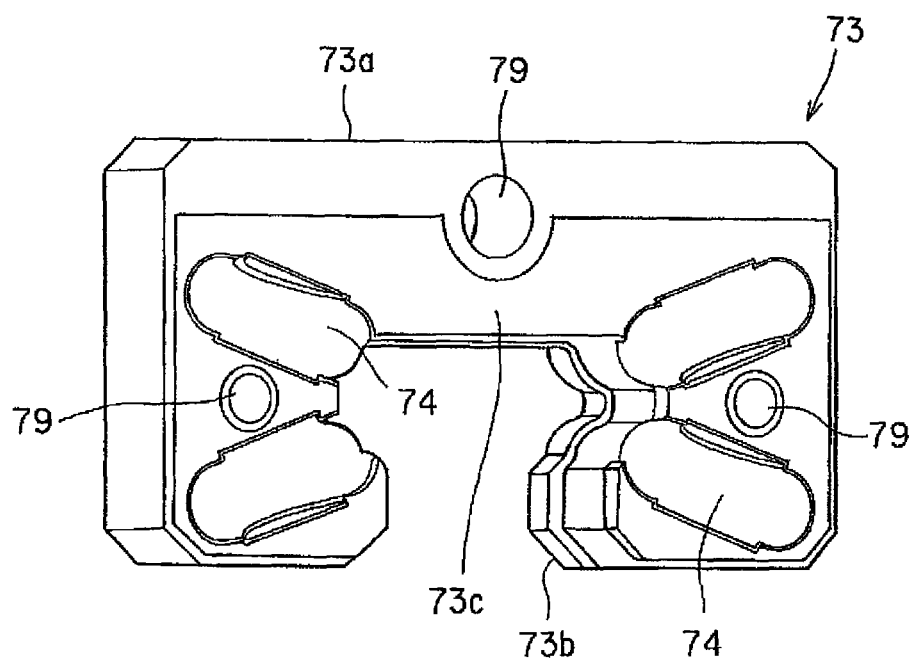
FIG. 14B is a view of the end plate according to the third embodiment seen from the mount surface side of the block body.
Figure 14C:
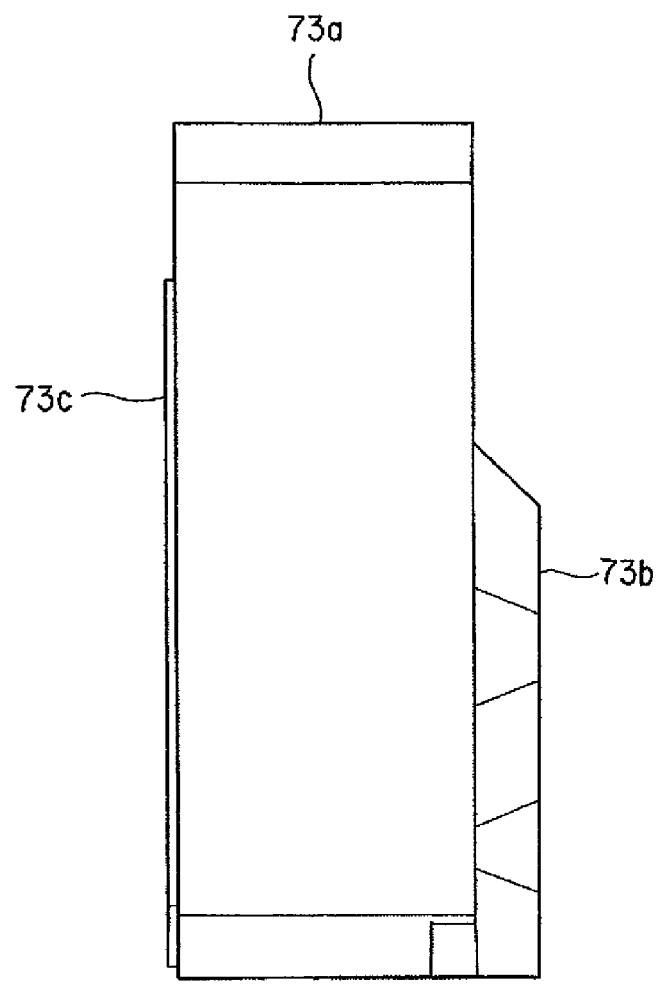
FIG. 14C is a view of the end plate according to the third embodiment viewed from a side surface side.

FIG. 14A is a view of the end plate 73 according to the third embodiment seen from a reverse side of a mount surface side of the block body 72, FIG. 14B is a view of the end plate 73 according to the third embodiment seen from the mount surface side of the block body 72, and FIG. 14C is a view of the end plate 73 according to the third embodiment viewed from a side surface side thereof.

The end plate 73 according to the third embodiment is provided with the end plate body 73a, the packing member 73c disposed on an abutting surface against the block body 72, and the seal member 73b disposed to slidably contact the track rail with no clearance with respect to the track rail 61, and these members are integrally formed through the two-color formation process.

The packing member 73c is a member disposed on the contacting surface side of the end plate 73 and the block body 72, and as shown in FIG. 14C, the packing member 73c is formed so as to slightly protrude over the surface contacting to the block body 72 of the end plate body 73a. According to the formation of this protruded portion, the packing member 73c attains the function as the packing at the time when the end plate 73 and the block body 72 are connected to each other to thereby seal the clearance between the end plate 73 and the block body 72.

Further, the packing member 73c is disposed at a position avoiding the location of the bolt holes 79 formed to the end plate body 73a (for example, as shown in FIG. 14B), whereby fastening force of the bolts functions only on the block body 72 and the end plate body 73a. According to this structure, the end plate 73 and the block body 72 can be disposed with no clearance or gap.

On the other hand, the seal member 73b is a member formed for closing a clearance existing between the track rail 61 and the movable block 71, and an end surface directing to the track rail disposing side has a shape corresponding to an outer configuration of the track rail 61. According to this structure, the noise generated inside the movable block 71 does not leak outside, and hence, the linear guide device 60 having high silencing effect can be provided. In addition, the positional alignment of the seal member 73b to the loaded rolling groove 62 of the track rail 61 can be eliminated, thus improving the productivity.

Figure 15A:
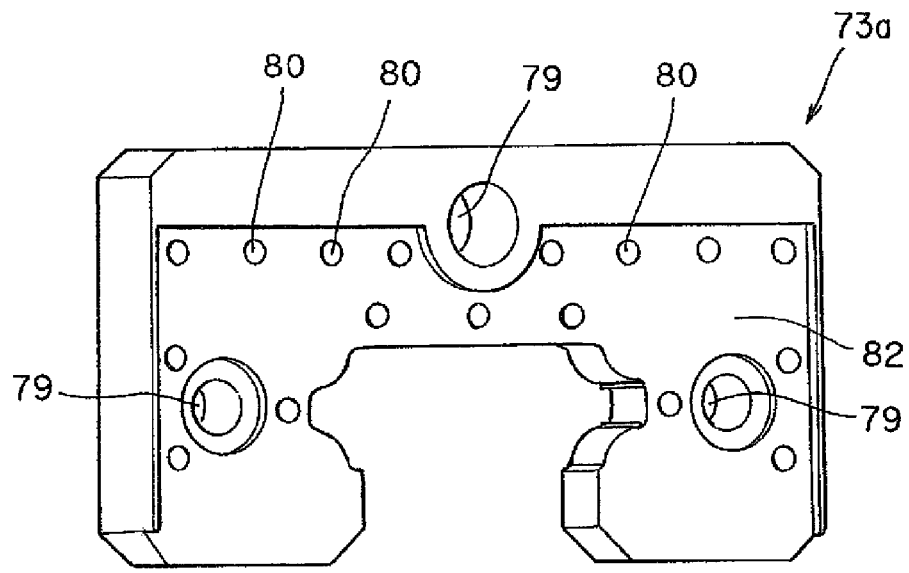
[FIG. 15A] is a view showing an end plate body according to the third embodiment as seen from a reverse side of the placing surface side of the block body.
Figure 15B:
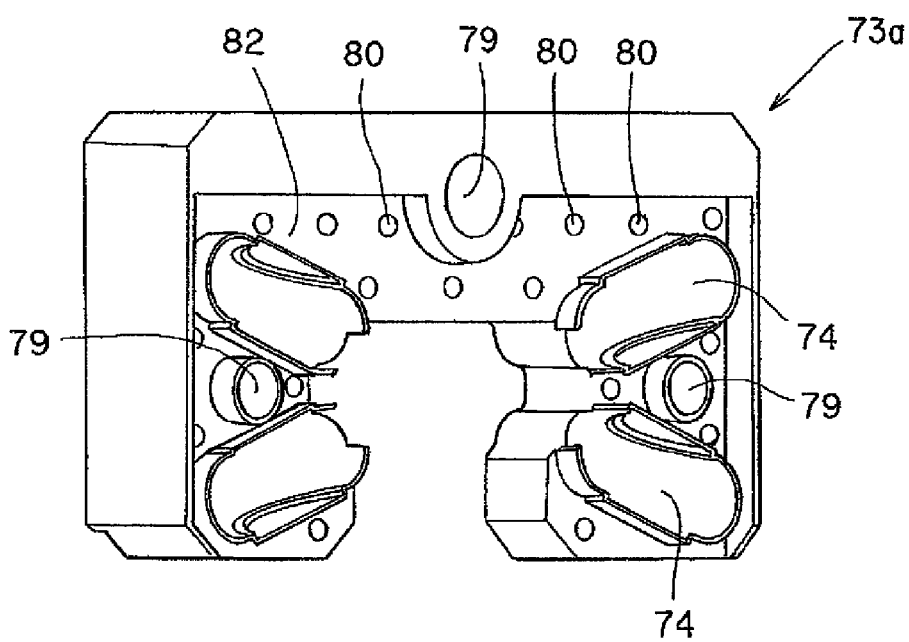
FIG. 15B is a view showing the end plate body according to the third embodiment as seen from the mount surface side of the block body.
Figure 16:
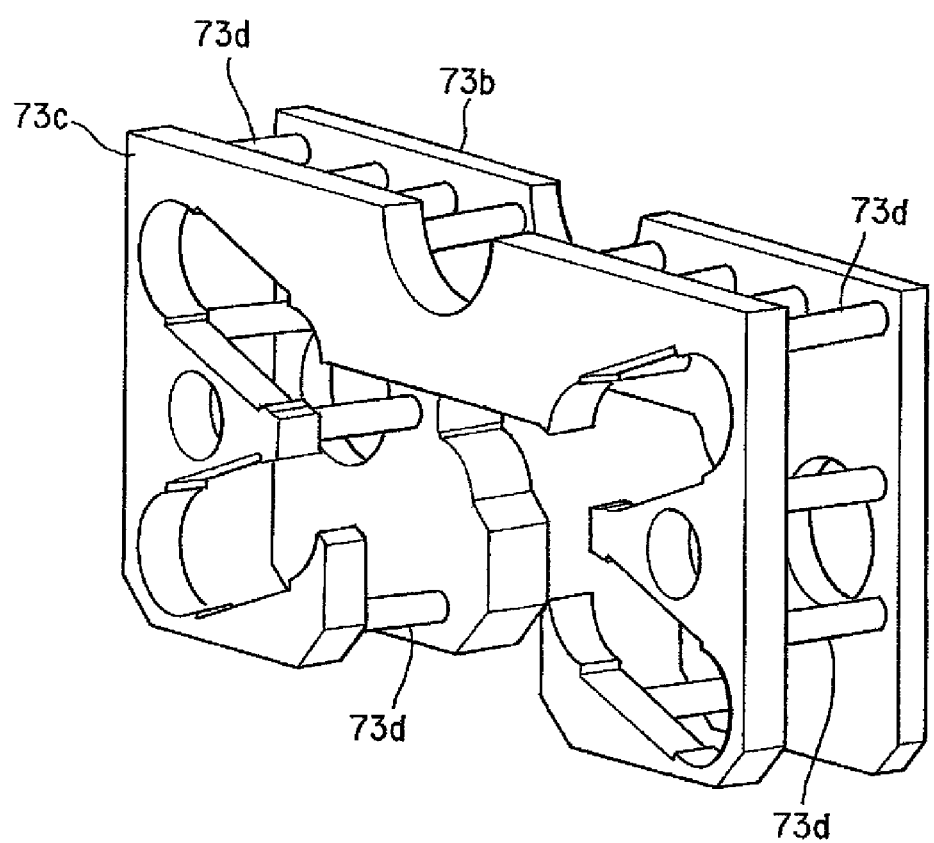
FIG. 16 shows the end plate, according to the third embodiment, which is constituted by a packing member, a seal member and a connection member, which are mounted to the end plate body.

Further, as shown in FIG. 15A to FIG. 16, the end plate body 73a, the packing member 73c and the seal member 73b can be surely connected by the integrating means composed of the through holes 80 formed to the end plate body 73a and the connection members 73d connecting the packing member 73c and the seal member 73b so as to penetrate the through holes 80. Furthermore, the strong integration of the end plate 73 can be achieved by fitting the packing member 73c and the seal member 73b into the recessed portions 82 formed to the end plate body 73a.

Fourth Embodiment

In the third embodiment mentioned above, the present invention is applied to the linear guide device 60, and moreover, the present invention may be applied to a ball spline device.

Figure 17:
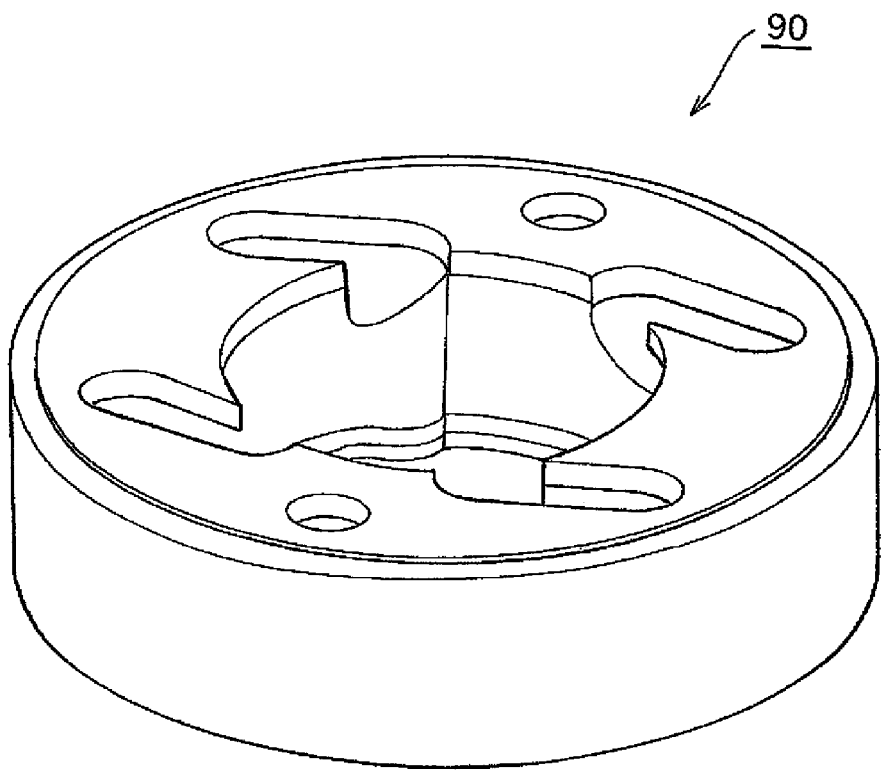
FIG. 17 is a view of an end cap according to a fourth embodiment of the present invention seen from a mounting surface side of a spline outer cylinder.
Figure 18A:
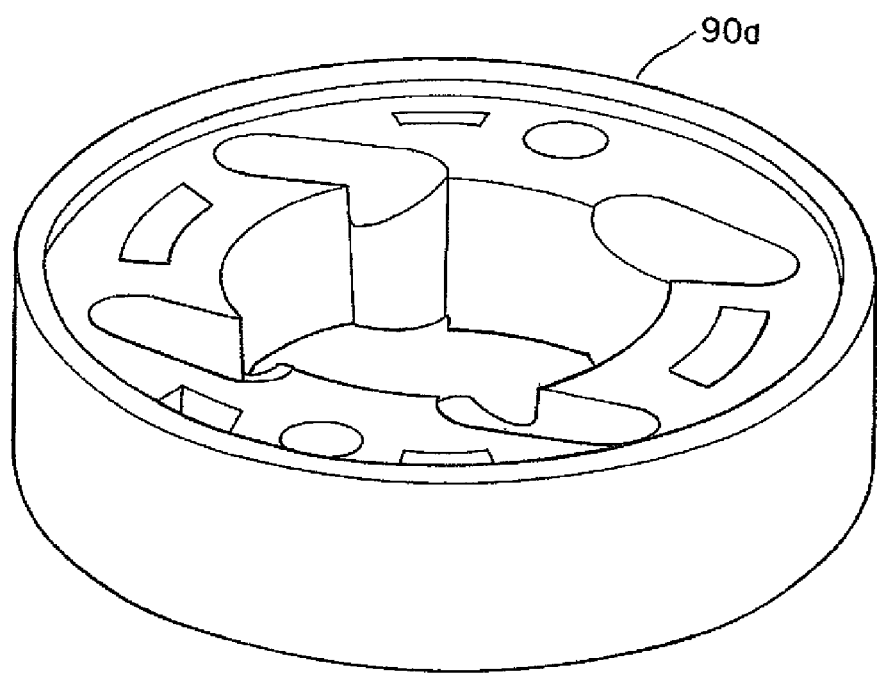
FIG. 18A is a view of the end cap body according to the fourth embodiment seen from the mount surface side of the spline outer cylinder.
Figure 18B:
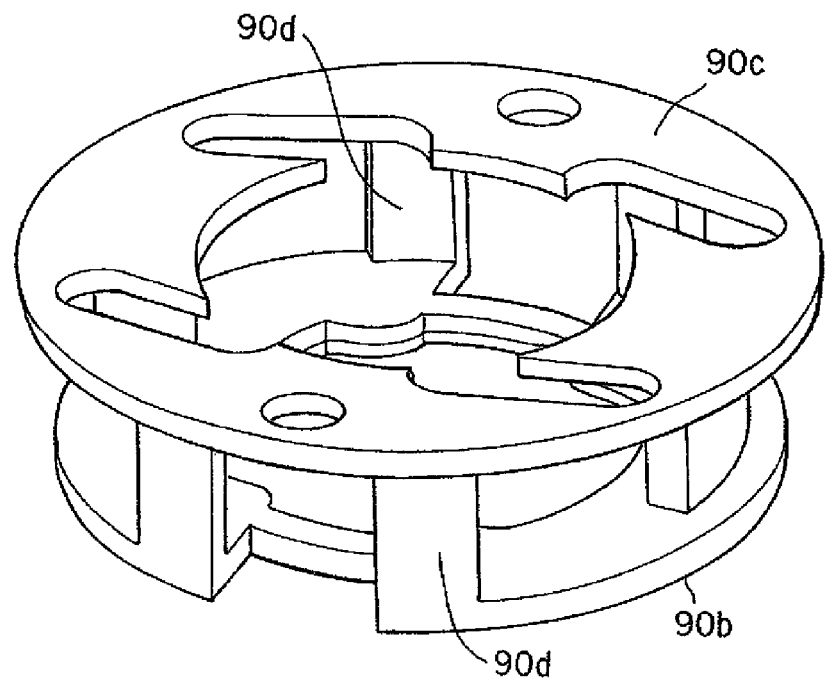
FIG. 18B shows the end cap, according to the fourth embodiment, which is constituted by a packing member, a seal member and a connection member, which are mounted to the end cap body, which is seen from the mount surface side of the spline outer cylinder.
Figure 19:
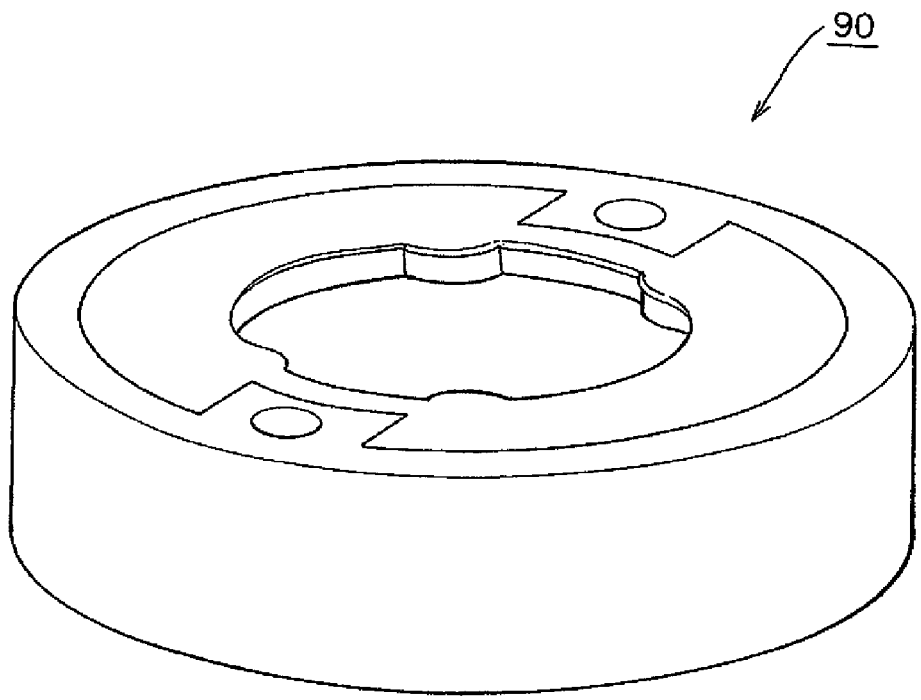
FIG. 19 is a view of the end cap according to the fourth embodiment of the present invention seen from the reverse side of the mount surface side of the spline outer cylinder.
Figure 20A:
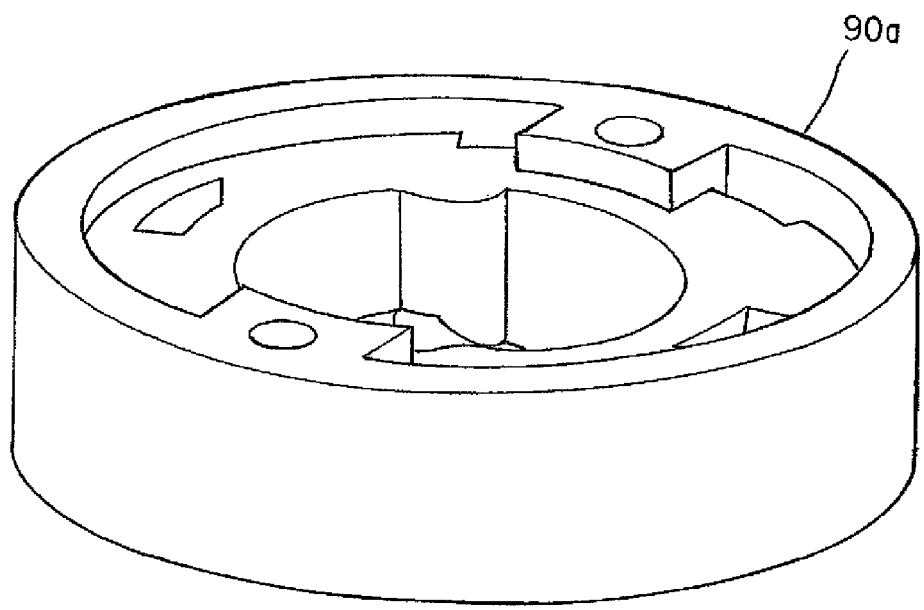
FIG. 20A is a view of the end cap body according to the fourth embodiment seen from the reverse side of the mount surface side of the spline outer cylinder.
Figure 20B:
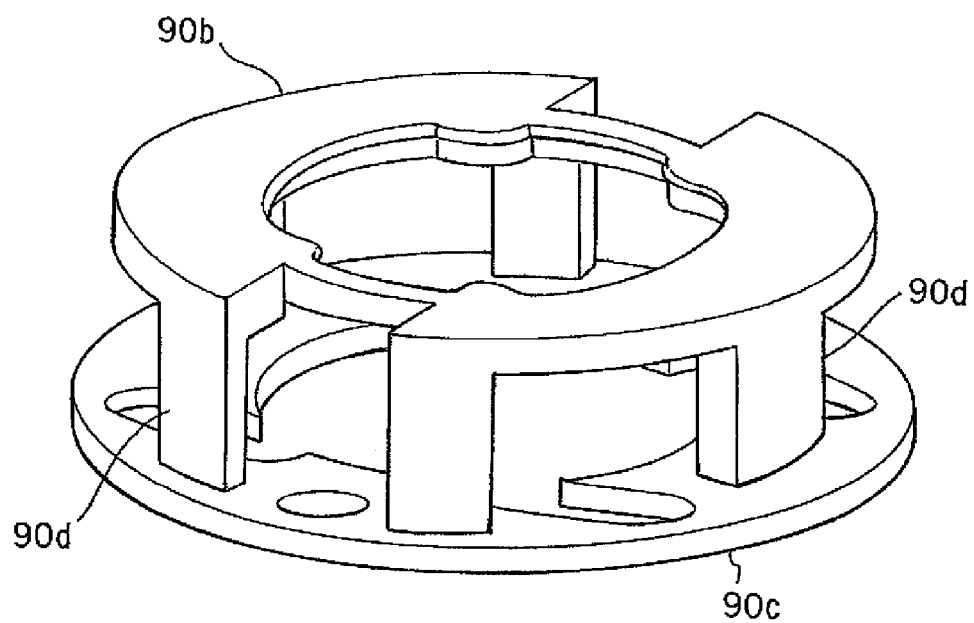
FIG. 20B shows the end cap, according to the fourth embodiment, which is constituted by a packing member, a seal member and a connection member, which are mounted to the end cap body, which is seen from the reverse side of the mount surface side of the spline outer cylinder.

For example, each of end caps 90 as end plates disposed both end portions of a spline outer cylinder of a ball spline device as explanatorily shown in FIG. 17 to FIG. 19 may be composed of an end cap body 90a shown in FIGS. 18A and 20A and a member formed of elastomer shown in FIGS. 18B and 20B integrally with the end cap body 90a. The member formed of the elastomer shown in FIGS. 18B and 20B is provided with a packing member 90c, a seal member 90b and connection members 90d, which are constructed with the same conditions as in the first to third embodiments mentioned hereinbefore, whereby a ball spline device having high silencing effect and requiring no seal position alignment working.

In the foregoing descriptions, although the preferred embodiments of the present invention were explained, the technical ranges of the present invention are not limited to the ranges of the descriptions of the respective embodiments, and the above-mentioned respective embodiments may be modified and changed variously.

For example, in the respective embodiments mentioned above, although there were described examples in which at least two members of the packing members 24; 44c, 73c, 90c and the seal members 24b, 44b, 73b, 90b are disposed with respect to the end plate bodies (or end cap body) 24a, 44a, 73a, 90a, the packing members 24c, 44c, 73c, 90c may be eliminated, and only the seal members 24b, 44b, 73b, 90b may be formed to the end plate bodies (end cap body) 24a, 44a, 73a, 90a, respectively. In these modifications, the clearances between the end plates (end cap) 24, 44, 73, 90 and the screw shafts 11 can be closed and sealed, so that sufficient silencing effect can be achieved, and the seal position alignment working can be eliminated.

Furthermore, as the integrating means for the packing members 24c, 44c, 73c, 90c and the seal members 24b, 44b, 73b, 90b to the end plate bodies (or end cap body) 24a, 44a, 73a, 90a, the examples utilizing the connection members 24d, 44d, 73d, 90d are explained in the above embodiments. However, as the integrating means, various known engaging means or fixing means may be utilized without limiting to the connection members 24d, 44d, 73d, 90d shown in the drawings. For example, without adopting a structure in which the integrating means penetrate the end plate bodies (end cap body) 24a, 44a, 73a, 90a mentioned in the respective embodiments, it may be possible to provide integrating means in which the end plate bodies (end cap body) 24a, 44a, 73a, 90a and the packing members 24c, 44c, 73c, 90c are integrated, and the end plate bodies (end cap body) 24a, 44a, 73a, 90a and the seal members 24b, 44b, 73b, 90b are integrated, respectively, independently. In such example, it may be preferred to form the end plates (end cap) 24, 44, 73, 90 by multi-color formation (molding) process without utilizing the two-color formation (molding) process.

Further, for integrating means in a case where the end plates (end cap) 24, 44, 73, 90 are only composed of the end plate bodies (end cap body) 24a, 44a, 73a, 90a and the seal members 24b, 44b, 73b, 90b, every kind or type of structure may be adopted. For example, such integrating means may be constituted and realized by forming the tip end portion of each of the connection members 24d, 44d, 73d, 90d mentioned in the above various embodiments so as to provide an engaging shape, and of course, many other engaging shapes may be adopted or many other fixing means may be utilized.

Furthermore, in the described respective embodiments, the through holes 30, 50, 80 are formed on the sides of the end plate bodies (end cap body) 24a, 44a, 73a, 90a, and the connection members 24d, 44d, 73d, 90d are formed on the sides of the packing members 24c, 44c, 73c, 90c, and the seal members 24b, 44b, 73b, 90b. However, such arrangement may be alternated from each other, and for example, in the structure in which both the packing member and the seal member are formed to the end plate (end cap), the packing member and the seal member may be formed integrally with one material, to which the through holes are formed, and the connection members are formed on the side of the end plate body (end cap) to thereby obtain the integrally formed end plate (end cap). Still furthermore, in the structure of the end plate (end cap) provided with only the seal member, the through holes may be formed to the seal member and the connection member may be formed to the end plate body (end cap body), thus providing the integrated end plate (end cap).

Further, it may be possible to form a play between each of the connection members 24d, 44d, 73d, 90d and the corresponding each of the through holes 30, 50, 80, both constituting the integrating means in combination, and the formation of such play therebetween will allow the seal members 24b, 44b, 73b, 90b to be movable in position with respect to the end plate bodies (end cap body) 24a, 44a, 73a, 90a. This possibility of positional movement of the seal member will make it possible to perform self-axial-adjustment of the seal member with respect to the inner member such as screw shaft, and hence, a preferred contacting condition between the seal member and the inner member can be always automatically achieved, which results in realization of the rolling device having high sealing performance.

Still furthermore, the end plate of the present invention may be formed as end cap 24 as in the first embodiment or as end plate 44 as in the second embodiment having only the sealing/packing function. Further, the end plate according to the present invention may be constructed so as to provide other functions within scopes achieving the functions and effects of the present invention.

Incidentally, it may be desirable to form the outer member (such as nut body 23) to which the end plate (end cap) 24, 44, 73 or 90 is mounted with high performance in dimension through a wire-discharge working. That is, in a conventional technology, when the seal member is formed to the rolling device, it is necessary to perform the alignment working to the position of the seal member. However, according to the present invention, the outer member (such as nut body 23) is worked with high performance as mentioned above, and accordingly, the end plate (end cap) 24, 44, 73 or 90 may only be set so as to accord with the positional standard of the outer member formed with high positional performance. Therefore, according to the present invention, the end plate can be mounted accurately with respect to the outer member without performing any positioning working.

Still furthermore, in all the above described embodiments of the rolling device, although the balls 31 are used as rolling members, other rolling members such as rollers may be applicable to the present invention. It will be clearly understood from the recitations of the appended claims that various modifications or changes made to the described embodiments may be within the technical scope of the present invention.

The invention claimed is:

1. A rolling device comprising:
   an inner member having an outer surface in which a rolling member rolling surface is formed;
   an outer member disposed outside the inner member and having a loaded rolling surface opposing to the rolling member rolling surface of the inner member; and
   a number of rolling members disposed to be rollable in a loaded rolling passage formed in combination of the rolling member rolling surface and the loaded rolling surface so that the outer member performs relative rotational motion or linear motion with respect to the inner member,
   wherein end plates are mounted to end portions of the outer member, each of the end plates being provided with an end plate body and a seal member disposed so as to slidably contact the inner member with no clearance, and the end plate body and the seal member are integrally formed,
   wherein the end plate body and the seal member are formed integrally through two-color formation process and an integrating unit for realizing integration of the seal member with respect to the end plate body is provided,
   wherein the integrating unit is composed of a plurality of through holes formed to the seal member and a plurality of connection members formed to the end plate body so as to penetrate the through holes, respectively.

2. The rolling device according to claim 1, wherein the connection members penetrate the corresponding through holes with plays, respectively.

3. The rolling device according to claim 1, wherein the end plate body is formed with a recessed portion to a position at which the seal member is formed so that the seal member is fitted to the recessed portion.

4. The rolling device according to claim 1, wherein the seal member is formed of a material softer than a material forming the end plate body.

5. The rolling device according to claim 1, wherein the end plate has a function as a pair of end caps disposed both end portions of the outer member, and the end caps are formed with direction changing passages to be connected to the loaded rolling passage so as to circulate the rolling members.

6. A rolling device comprising:
   an inner member having an outer surface in which a rolling member rolling surface is formed;
   an outer member disposed outside the inner member and having a loaded rolling surface opposing to the rolling member rolling surface of the inner member; and
   a number of rolling members disposed to be rollable in a loaded rolling passage formed in combination of the rolling member rolling surface and the loaded rolling surface so that the outer member performs relative rotational motion or linear motion with respect to the inner member,
   wherein end plates are mounted to end portions of the outer member, each of the end plates being provided with an end plate body and a seal member disposed so as to slidably contact the inner member with no clearance, and the end plate body and the seal member are integrally formed,
   wherein the end plate body and the seal member are formed integrally through two-color formation process and an integrating unit for realizing integration of the seal member with respect to the end plate body is provided,
   wherein the integrating unit is composed of a plurality of through holes formed to the end plate body and a plurality of connection members formed to the seal member so as to penetrate the through holes, respectively.

7. The rolling device according to claim 6, wherein the connection members penetrate the corresponding through holes with plays, respectively.

8. The rolling device according to claim 6, wherein the end plate body is formed with a recessed portion to a position at which the seal member is formed so that the seal member is fitted to the recessed portion.

9. A rolling device comprising:
   an inner member having an outer surface in which a rolling member rolling surface is formed;
   an outer member disposed outside the inner member and having a loaded rolling surface opposing to the rolling member rolling surface of the inner member; and
   a number of rolling members disposed to be rollable in a loaded rolling passage formed in combination of the rolling member rolling surface and the loaded rolling surface so that the outer member performs relative rotational motion or linear motion with respect to the inner member,
   wherein end plates are mounted to end portions of the outer member, each of the end plates being provided with an end plate body and a seal member disposed so as to slidably contact the inner member with no clearance, and the end plate body and the seal member are integrally formed,
   wherein the end plate is provided with a packing member disposed to an abutting surface to the outer member, and the end plate body, the packing member and the seal member are formed integrally,
   wherein the end plate body, the packing member and the seal member are formed integrally through two-color formation process, and an integrating unit is provided for realizing integration of the packing member and the seal member with respect to the end plate body,
   wherein the integrating unit is composed of a plurality of through holes formed to the end plate body and a plurality of connection members penetrating the through holes respectively and connecting the seal member and the packing member.

10. The rolling device according to claim 9, wherein the connection members penetrate the corresponding through holes with plays, respectively.

11. The rolling device according to claim 9, wherein the end plate body is formed with recessed portions to positions at which the packing member and the seal member are formed so that the packing member and the seal member are fitted to the recessed portions.

12. The rolling device according to claim 9, wherein the abutting surface of the packing member to the outer member is formed so as to protrude over a mount surface to the outer member in the end plate body.

13. The rolling device according to claim 9, wherein the packing member and the seal member are formed of a material softer than a material forming the end plate body.

14. A rolling device comprising:
   an inner member having an outer surface in which a rolling member rolling surface is formed;
   an outer member disposed outside the inner member and having a loaded rolling surface opposing to the rolling member rolling surface of the inner member; and
   a number of rolling members disposed to be rollable in a loaded rolling passage formed in combination of the rolling member rolling surface and the loaded rolling surface so that the outer member performs relative rotational motion or linear motion with respect to the inner member, wherein end plates are mounted to end portions of the outer member, each of the end plates being provided with an end plate body and a seal member disposed so as to slidably contact the inner member with no clearance, and the end plate body and the seal member are integrally formed, wherein the end plate is provided with a packing member disposed to an abutting surface to the outer member, and the end plate body, the packing member and the seal member are formed integrally, wherein the end plate body, the packing member and the seal member are formed integrally through two-color formation process, and an integrating unit is provided for realizing integration of the packing member and the seal member with respect to the end plate body, wherein the packing member and the seal member are formed as one member, and the integrating unit is composed of a plurality of through holes formed to the member including the packing member and the seal member and a plurality of connection members formed to the end plate body so as to penetrate the corresponding through holes, respectively.

15. A rolling device comprising:

an inner member having an outer surface in which a rolling member rolling surface is formed;

an outer member disposed outside the inner member and having a loaded rolling surface opposing to the rolling member rolling surface of the inner member; and a number of rolling members disposed to be rollable in a loaded rolling passage formed in combination of the rolling member rolling surface and the loaded rolling surface so that the outer member performs relative rotational motion or linear motion with respect to the inner member, wherein end plates are mounted to end portions of the outer member, each of the end plates being provided with an end plate body and a seal member disposed so as to slidably contact the inner member with no clearance, and the end plate body and the seal member are integrally formed, wherein the end plate is provided with a packing member disposed to an abutting surface to the outer member, and the end plate body, the packing member and the seal member are formed integrally, wherein the end plate is fastened to the outer member by means of bolt, and the packing member is disposed to a region avoiding, in location, a fastening position of the bolt.

* * * * *

UNITED STATES PATENT AND TRADEMARK OFFICE
CERTIFICATE OF CORRECTION

PATENT NO.       : 8,511,896 B2
APPLICATION NO. : 12/678752
DATED            : August 20, 2013
INVENTOR(S)      : Shirai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this
Fifteenth Day of September, 2015

Michelle K. Lee
*Director of the United States Patent and Trademark Office*